United States Patent
Koike

(10) Patent No.: US 7,933,048 B2
(45) Date of Patent: Apr. 26, 2011

(54) IMAGE READING APPARATUS, SERVER APPARATUS, AND IMAGE PROCESSING SYSTEM

(75) Inventor: Hisashi Koike, Sakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 1168 days.

(21) Appl. No.: 11/275,737

(22) Filed: Jan. 26, 2006

(65) Prior Publication Data

US 2006/0170960 A1    Aug. 3, 2006

(30) Foreign Application Priority Data

Jan. 31, 2005  (JP) ................... 2005-023178

(51) Int. Cl.
*H04N 1/00* (2006.01)
(52) U.S. Cl. ........ 358/403; 358/401; 358/474; 715/229; 382/209; 382/217; 382/218
(58) Field of Classification Search .................. 358/403; 715/229; 382/209, 217, 218
See application file for complete search history.

(56) References Cited

U.S. PATENT DOCUMENTS

| | | | | |
|---|---|---|---|---|
| 5,671,341 | A | 9/1997 | Kashiwazaki et al. | 395/112 |
| 5,721,940 | A * | 2/1998 | Luther et al. | 715/200 |
| 5,764,368 | A * | 6/1998 | Shibaki et al. | 358/296 |
| 6,917,438 | B1 | 7/2005 | Yoda et al. | 358/1.15 |
| 6,950,553 | B1 * | 9/2005 | Deere | 382/218 |
| 7,289,685 | B1 * | 10/2007 | Wolff et al. | 382/317 |
| 2005/0185225 | A1 * | 8/2005 | Brawn et al. | 358/401 |
| 2005/0190394 | A1 * | 9/2005 | Ohue | 358/1.13 |

FOREIGN PATENT DOCUMENTS

| | | |
|---|---|---|
| JP | 10-105654 | 4/1998 |
| JP | 2001-126026 | 5/2001 |
| JP | 2004-5268 | 1/2004 |

* cited by examiner

*Primary Examiner* — Twyler L Haskins
*Assistant Examiner* — Kent Yip
(74) *Attorney, Agent, or Firm* — Fitzpatrick, Cella, Harper & Scinto

(57) ABSTRACT

A control method of an image reading apparatus for transferring image information obtained by reading an original to a server apparatus has: a reading step of reading the original; a forming step of forming electronic data corresponding to the original read in the reading step; a designation step of designating an attribute of the original; a decision step of deciding a page whose electronic data is to be formed in the forming step in accordance with the designated original attribute; and a transmission step of transmitting the electronic data formed in the forming step to the server apparatus.

9 Claims, 19 Drawing Sheets

FIG. 12

| FORM TYPE | THE NUMBER OF PAGES (THE NECESSARY NUMBER/THE TOTAL NUMBER) | DUPLEX ATTRIBUTE [ONE OF SIMPLEX, DUPLEX, MIX] | SCAN MODE LIST [ONE OF DOCUMENT, PHOTOGRAPH, IGNORANCE PAGE BY PAGE] | ... |
|---|---|---|---|---|
| FORM A | 1/1 | SIMPLEX | DOCUMENT | ... |
| FORM B | 2/4 | DUPLEX | DOCUMENT-DOCUMENT-IGNORANCE-IGNORANCE | ... |
| FORM C | 3/3 | SIMPLEX | DOCUMENT-DOCUMENT-PHOTOGRAPH | ... |
| FORM D | 3/3 | MIX | — | ... |

STORAGE MEDIUM SUCH
AS FD/CD-ROM, ETC.

| DIRECTORY INFORMATION |
|---|
| 1ST DATA PROCESSING PROGRAM<br>PROGRAM CODE GROUP CORRESPONDING TO STEPS<br>OF FLOWCHART SHOWN IN FIG. 5 |
| 2ND DATA PROCESSING PROGRAM<br>PROGRAM CODE GROUP CORRESPONDING TO STEPS<br>OF FLOWCHART SHOWN IN FIG. 6 |
| 3RD DATA PROCESSING PROGRAM<br>PROGRAM CODE GROUP CORRESPONDING TO STEPS<br>OF FLOWCHART SHOWN IN FIG. 7 |
| 6TH DATA PROCESSING PROGRAM<br>PROGRAM CODE GROUP CORRESPONDING TO STEPS<br>OF FLOWCHART SHOWN IN FIG. 10 |
| 7TH DATA PROCESSING PROGRAM<br>PROGRAM CODE GROUP CORRESPONDING TO STEPS<br>OF FLOWCHART SHOWN IN FIG. 11 |
| 8TH DATA PROCESSING PROGRAM<br>PROGRAM CODE GROUP CORRESPONDING TO STEPS<br>OF FLOWCHART SHOWN IN FIG. 13 |
| 9TH DATA PROCESSING PROGRAM<br>PROGRAM CODE GROUP CORRESPONDING TO STEPS<br>OF FLOWCHART SHOWN IN FIG. 14 |
| 10TH DATA PROCESSING PROGRAM<br>PROGRAM CODE GROUP CORRESPONDING TO STEPS<br>OF FLOWCHART SHOWN IN FIG. 15 |

MEMORY MAP IN STORAGE MEDIUM

FIG. 19

STORAGE MEDIUM SUCH AS FD/CD-ROM, ETC.

| DIRECTORY INFORMATION |
|---|
| 1ST DATA PROCESSING PROGRAM<br>PROGRAM CODE GROUP CORRESPONDING TO STEPS OF FLOWCHART SHOWN IN FIG. 8 |
| 2ND DATA PROCESSING PROGRAM<br>PROGRAM CODE GROUP CORRESPONDING TO STEPS OF FLOWCHART SHOWN IN FIG. 9 |
| |

MEMORY MAP IN STORAGE MEDIUM

IMAGE READING APPARATUS, SERVER APPARATUS, AND IMAGE PROCESSING SYSTEM

BACKGROUND OF THE INVENTION

1. Field of the Invention

The invention relates to an image reading apparatus which can transfer image information that is obtained by reading an original to a server apparatus through a network and relates to the server apparatus, an image processing system, an image processing method, a storing medium in which a computer-readable program has been stored, and the program.

2. Related Background Art

In conventional various businesses, a form (a template in which various fields to fill in and graphic objects are defined) of paper is generally used for transferring and storing information. An effort to raise business efficiency by converting the form into electronic data so that it can be handled by a computer system has been made.

When the form of the paper is converted into the electronic data, a bit map image is formed by using a scanner. However, if the form is handled as an image as it is, a capacity is large and it is difficult to use it again. Therefore, as a system for converting the form data into text data and enabling the information to be easily handled, there is an OCR (Optical Character Recognition) system.

In the OCR system, a method of raising a character recognition ratio by using a fact that a regular pattern of the form has been predetermined is used. For example, if information showing at which position on a page a character of which pattern has been written is prepared as a template, a width of selection upon character recognition is narrowed, so that the character recognition ratio is remarkably improved.

If one form is constructed by one page, processes using the template are easy. However, actually, one form is generally constructed by a plurality of pages whose writing positions are different. The templates of the plurality of pages are prepared per form and several processing methods are used.

Specifically speaking, there are the following methods: (1) only one form is read out from a scanner and the form data is converted into the text data on a form unit basis; (2) the forms are scanned in a lump from a document feeder, the page number is automatically discriminated on a page unit basis (generally called form recognition), and the optimum template is selected; and (3) generally, a plurality of forms are read out in a lump from the document feeder; and the like. In the case of the above method (3), in many cases, all of the forms have the same format (JP-A-2004-005268). However, in the above method (1), although the template of the corresponding page can be certainly used, since the operation of the scanner has to be executed on a form unit basis, it takes a processing time and efforts.

In the above method (2), by using the document feeder, a large quantity of documents can be read out in a lump and the troublesomeness of the processes can be reduced. However, in the form recognition, since the optimum template is selected from all of the prepared templates of the pages, the page number is liable to be erroneously recognized, the processes become very heavy, and it takes a long time for the processes.

If an original is not prepared as paper but the original has been prepared as a PDF file or an application file and the creator of the form original prints by himself, there is a case where it is impossible to discriminate whether the original is formed as a form original in either a simplex printing mode or a duplex printing mode in dependence on an environment of the creator. In such a case, In the above method (3), even in the form of the same format, it cannot be simply subjected to the OCR process but it is necessary to execute a preparation such as removal of a white page or the like. Further, in the above method (3), there is also a problem that in the batch reading operation, if a certain form is partitioned on the way, when it is intended to collect the OCR processes on a form unit basis, the user has to wait until the next batch reading process and the OCR process are finished.

SUMMARY OF THE INVENTION

The invention is made to solve at least one of the above problems and is made to accomplish at least one of the following objects. The first object of the invention is to provide an image reading apparatus which can efficiently produce form data that can remarkably reduce a form recognition processing burden on the server apparatus side and to provide an image processing method, a storing medium in which a computer-readable program has been stored, and the program.

The second object of the invention is to provide a server apparatus which can freely construct a system for storing templates each showing a form construction to execute a character recognizing process every form type, executing a character recognizing process in which a form recognition processing burden has remarkably been reduced, efficiently converting form data into electronic data in a short time, and accumulating the electronic data and to provide an image processing method, a storing medium in which a computer-readable program has been stored, and the program.

The third object of the invention is to provide an image processing system which can freely construct a system for executing a character recognizing process in which a form recognition processing burden has remarkably been reduced while efficiently forming form data that can remarkably reduce the form recognition processing burden on a server apparatus side, efficiently converting the form data into electronic data in a short time, and accumulating the electronic data.

According to the invention, there is provided an image reading apparatus for transferring image information that is obtained by reading an original to a server apparatus, comprising: a reading unit adapted to read the original; a forming unit adapted to form electronic data corresponding to the original read by the reading unit; a designation unit adapted to designate an attribute of the original; a decision unit adapted to decide a page whose electronic data is to be formed by the forming unit in accordance with the designated attribute of the original; and a transmission unit adapted to transmit the electronic data formed by the forming unit to the server apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 12 is a diagram showing an example of a form pattern information table shown in FIG. 2;

FIG. 18 is a diagram for explaining a memory map of a storing medium for storing various data processing programs which can be read out by the image processing system to which the image reading apparatus according to the embodiment can be applied; and FIG. 19 is a diagram for explaining a memory map of a storing medium for storing various data processing programs which can be read out by the image processing system to which the server apparatus according to the embodiment can be applied.

DETAILED DESCRIPTION OF THE PREFERRED EMBODIMENTS

The best mode for carrying out the invention will not be described with reference to the drawings.

First Embodiment

Figure 1:
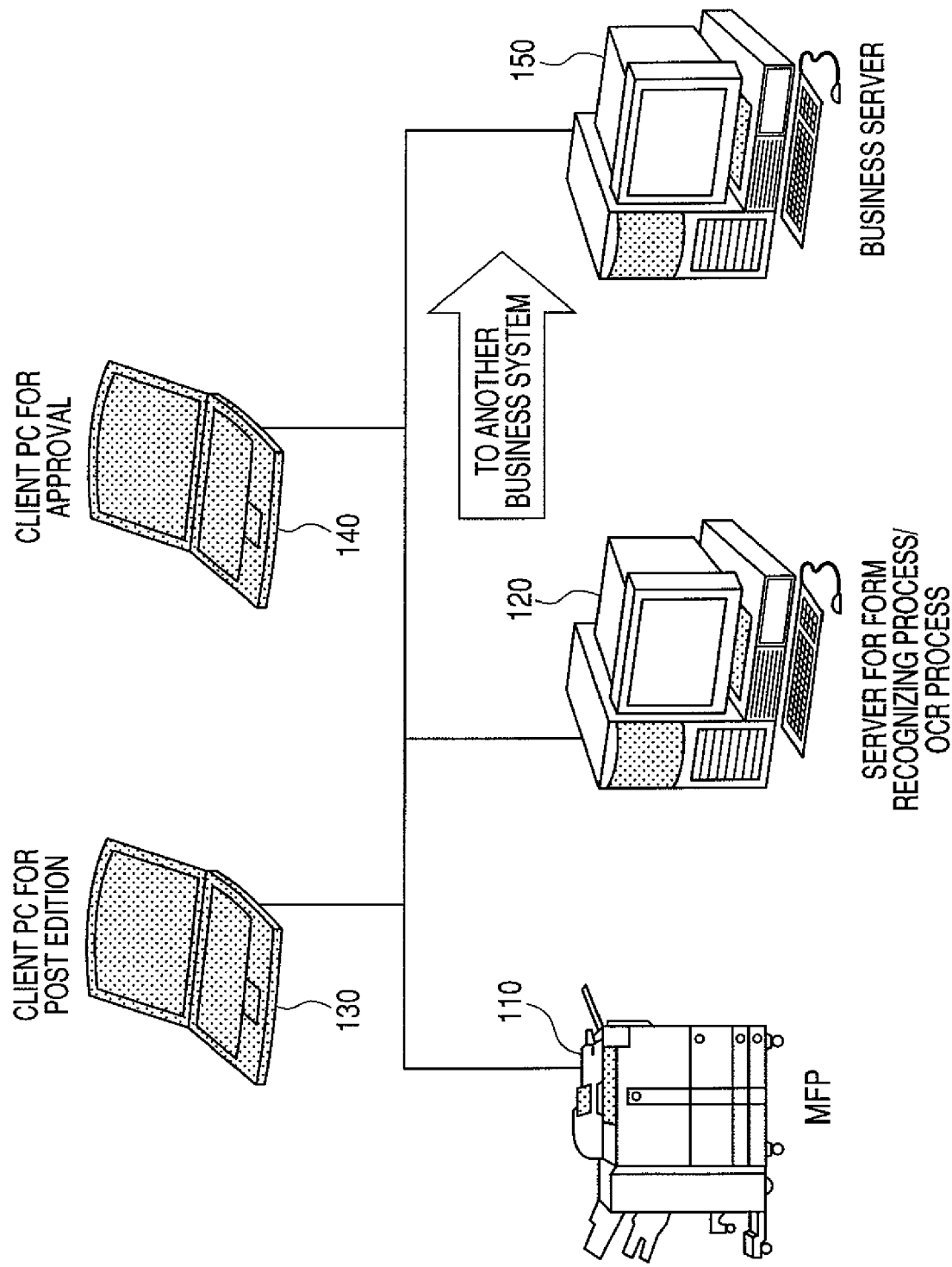
FIG. 1 is a block diagram for explaining a construction of an image processing system to which an image reading apparatus and a server apparatus showing the first embodiment can be applied.

FIG. 1 is a block diagram for explaining a construction of an image processing system to which an image reading apparatus showing the first embodiment and a server apparatus can be applied. Although a multi-function apparatus is used as an example of the image reading apparatus in the embodiment, the invention can be also applied to a scanner apparatus having a network communicating function.

In FIG. 1, reference numeral 110 denotes a multi-function apparatus (MFP) having a scanner function, a printer function, a copy function, and the like; 120 a server apparatus (server) for executing a form recognizing process and an OCR process; and 130 a client PC for confirming or correcting processing results of the form recognition in the server 120 and the OCR.

Reference numeral 140 denotes a client PC for approving a result of the confirmation or correction in the client PCs 130 and 150 indicates a business server using electronic data approved in the client PC 140. The MFP 110, server 120, client PC 130, and business server 150 are constructed so that they can communicate with each other through the network.

Figure 2:
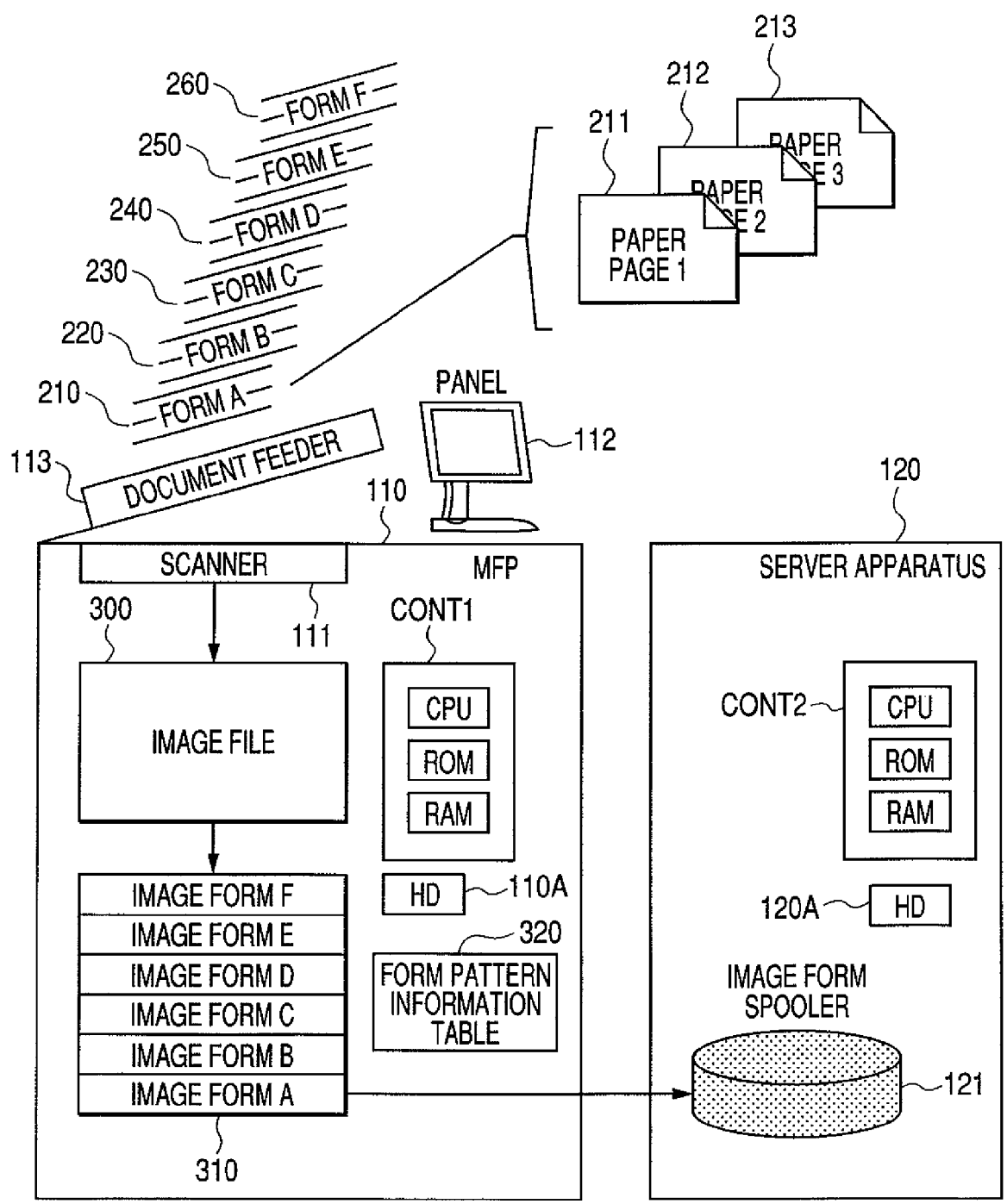
FIG. 2 is a schematic diagram for explaining an example of original processes of an MFP and a server shown in FIG. 1.

FIG. 2 is a schematic diagram for explaining an example of original processes of the MFP 110 and the server 120 shown in FIG. 1. FIG. 2 corresponds to an example of the original processes for reading an image of the original by using the scanner function of the MFP 110 and transferring image data of the read original image to the server 120.

In FIG. 2, reference numeral 111 denotes a scanner for reading each page of the original which is fed from a document feeder 113 and transferring an image file 300 of the image data converted into a bit map on a page unit basis as an example of form data to the server 120. The image file 300 is not limited only to the bit map data but can be also constructed by image data which has been compressed by JPEG, TIFF, or the like.

Reference numeral 112 denotes a panel constructed by keys for instructing function setting, a reading process, and the like to the MFP 110, a display, and the like; 113 the document feeder for feeding a plurality of forms one page by one to the scanner 111; and 210, 220, 230, 240, 250, and 260 business forms (forms) having the same format. The form 210 is constructed by forms 211, 212, and 213 of a plurality of pages such as page 1, page 2, and page 3.

Bundles of a plurality of forms 210 to 260 have been set on the document feeder 113 at present.

Reference numeral 300 denotes the image file which is scanned from each of the forms 210, 220, 230, 240, 250, and 260 and temporarily stored into an internal memory of a controller unit CONT1 or stored into a hard disk (HD) 110A.

Reference numeral 310 denotes an image form which is cut out from the image file 300 stored in the internal memory on a form unit basis (forms 210, 220, 230, 240, 250, and 260) by a CPU of the controller unit CONT1 or an image processor or the like (not shown). Reference numeral 121 denotes an image form spooler constructed by, for example, the hard disk (HD 110A). The spooler 121 is provided in the server 120.

Reference numeral 320 denotes a form pattern information table which is formed and stored by a data processing apparatus having page construction information and the like regarding the forms which can be read. The form pattern information table 320 is downloaded to the MFP 110 at proper timing through the network.

The image form 310 cut out in the MFP 110 is sent to the image form spooler 121 through the network. In this instance, the controller unit CONT1 can arbitrarily compress the data of the image form file by a predetermined compression format and the server apparatus 120 can arbitrarily decompress the compressed image form file and process it.

The server apparatus 120 has a controller unit CONT2 including a CPU, a RAM, a ROM, or the like and is constructed so that it can communicate with the client PC or MFP 110 on the network through a network controller (not shown).

In accordance with procedures of flowcharts, which will be explained hereinafter, the server apparatus 120 obtains the image form 310 derived from the MFP 110, executes the OCR process with reference to a form template of each form type, and forms an electronic form into a hard disk (HD) 120A. It is also possible to construct in such a manner that the formed electronic form is converted into a predetermined electronic document format (for example, PDF format) or a document file corresponding to a general application for business and spooled.

The controller unit CONT2 is also constructed in such a manner that it can execute a form recognition processing program in the hard disk (HD) 120A and execute the form recognizing process from the image form 310.

Further, the HD 120A also functions as a spooler for storing the image form, form template, electronic form, and the like.

Although the embodiment will be described with respect to the case where the form type is designated and inputted from the panel 112, the form type can be also designated from the client PC 130 or 140 on the network.

It is also possible to construct in such a manner that the controller unit CONT1 of the MFP 110 holds the formed image forms in the HD 110A in consideration of the case where it is notified of a form error from the server apparatus 120, and if the error indicates that the order of the pages differs, replacement or the like of the page order is performed and the image forms are transferred again to the server apparatus 120.

Figure 3:
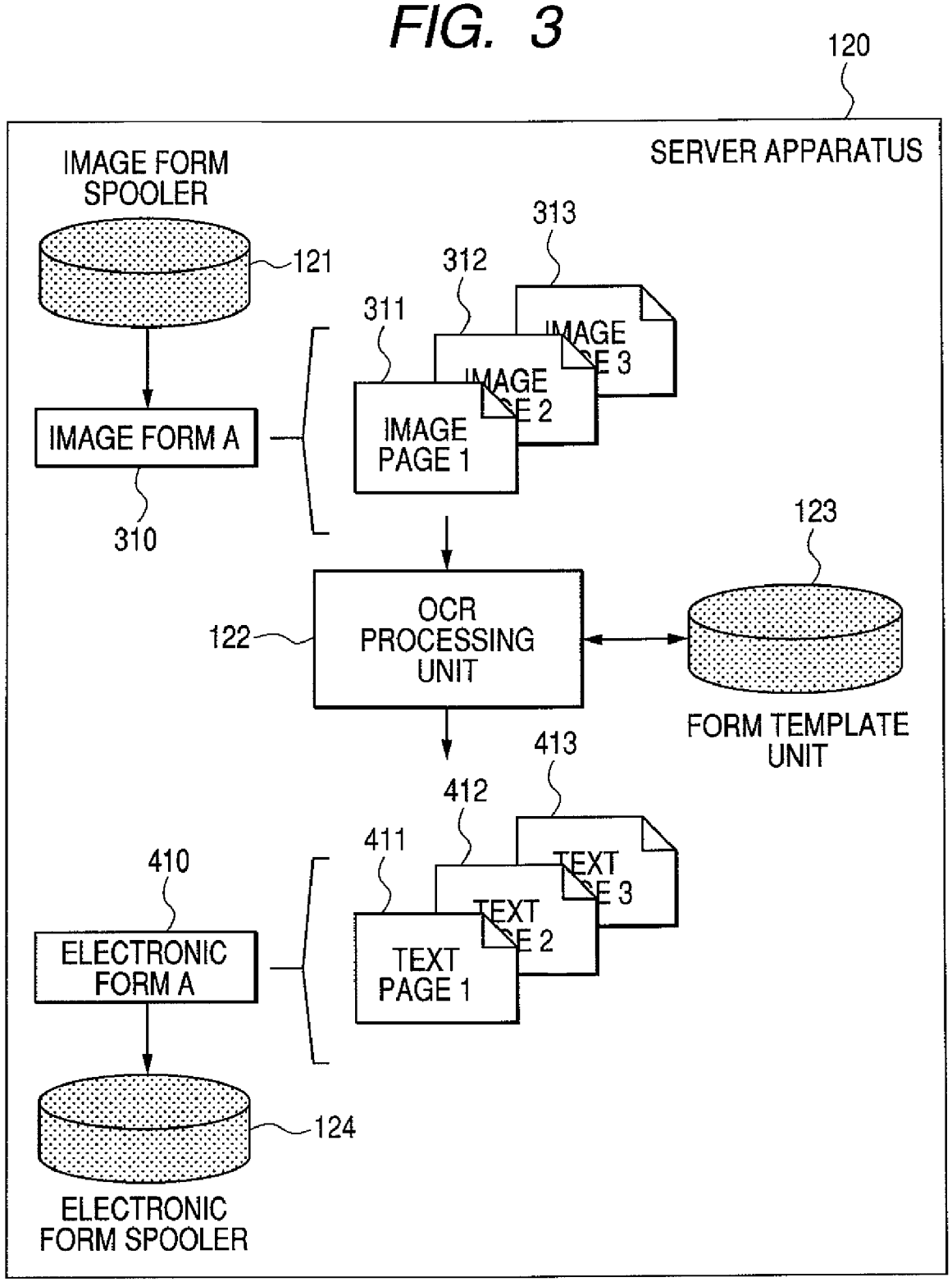
FIG. 3 is a schematic diagram for explaining an example of data processes of the server shown in FIG. 1.

FIG. 3 is a schematic diagram for explaining an example of data processes of the server 120 shown in FIG. 1. The same component elements as those in FIG. 2 are designated by the same reference numerals.

In FIG. 3, the image form 310 in the image form spooler 121 is constructed by image pages 311, 312, and 313.

Reference numeral 122 denotes an OCR processing unit for reading an OCR module stored in an external storage device (not shown) into a work memory (not shown) and executing the OCR process to the image pages 311, 312, and 313.

Reference numeral 123 denotes a form template unit in which a plurality of form templates registered from the user or the like have been registered. The OCR processing unit 122 can refer to the form templates.

Reference numeral 410 denotes an electronic form A constructed by text pages 411, 412, and 413 which have been OCR-processed by the OCR processing unit 122 and 124 indicates an electronic form spooler for storing the electronic forms.

Figure 4:
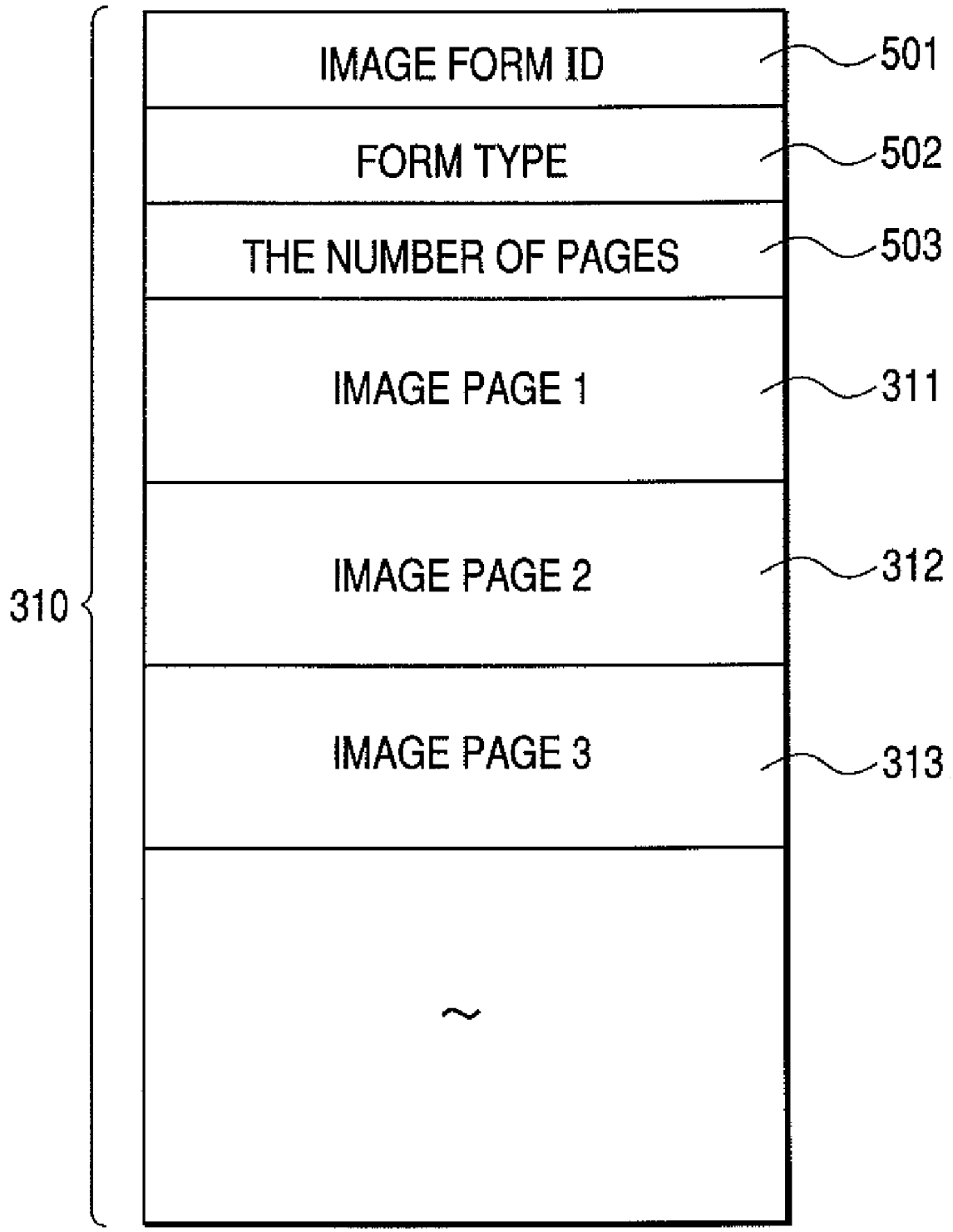
FIG. 4 is a structural diagram showing an example of a format of an image form file shown in FIG. 3.

FIG. 4 is a structural diagram showing an example of a format of the image form file 310 shown in FIG. 3. The same component elements as those in FIG. 3 are designated by the same reference numerals.

In FIG. 4, reference numeral 501 denotes an image form ID; 502 a form type; and 503 the number of pages constructed by the image pages 311, 312, and 313. The image form 310 constructed by the image pages 311, 312, and 313 has been stored in image areas which are continuously held on the image form spooler 121.

Figure 5:
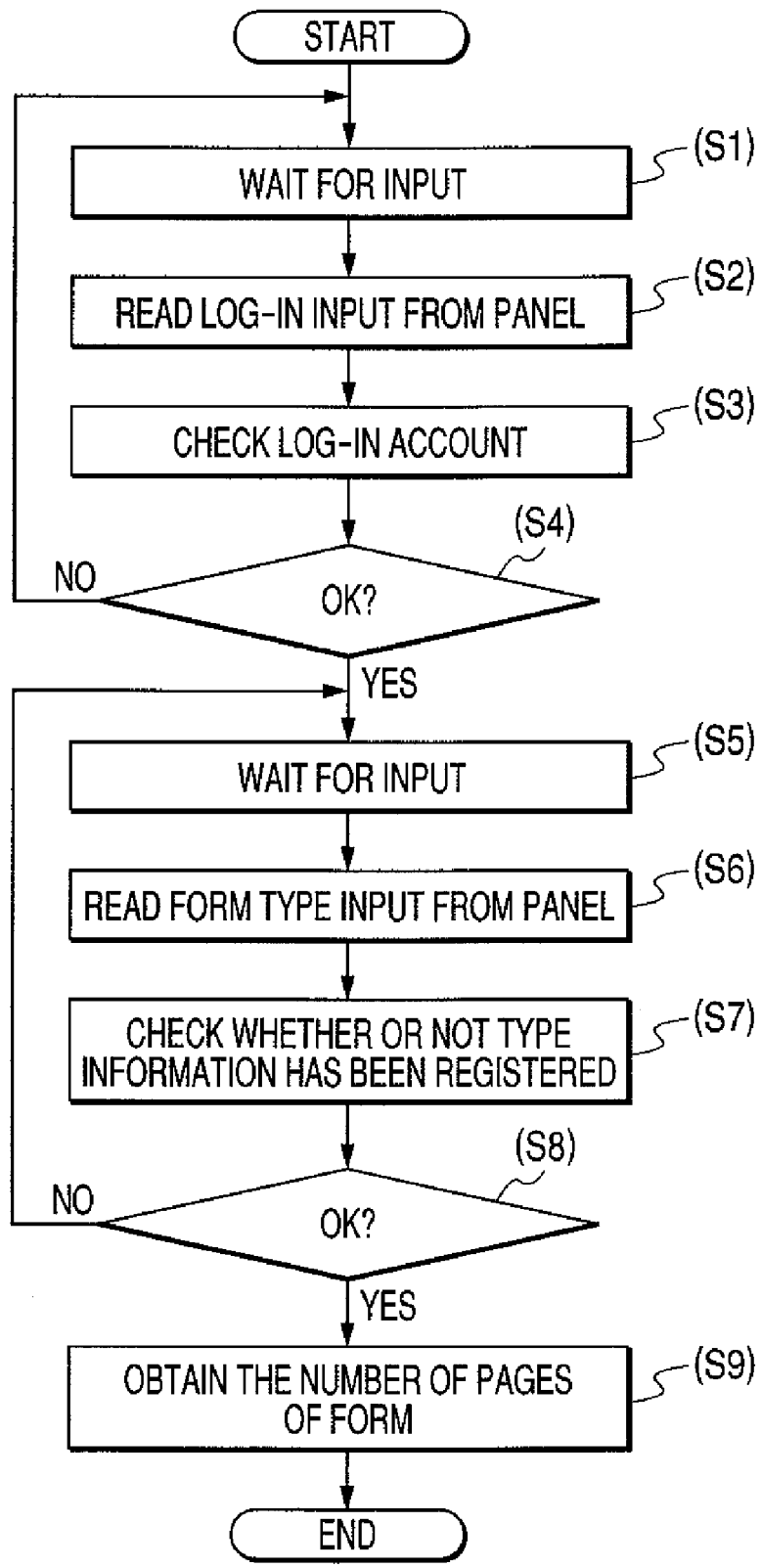
FIG. 5 is a flowchart showing an example of a first data processing procedure in the image reading apparatus according to the embodiment.

FIG. 5 is the flowchart showing an example of the first data processing procedure in the image reading apparatus according to the invention. FIG. 5 corresponds to a processing procedure in the MFP 110 when the user logs in from the client PC 140. S1 to S9 denote processing steps, respectively. Each processing step is realized when it is executed by the CPU in the controller unit CONT1 of the MFP 110.

When no processes are executed in particular, the MFP 110 is waiting for an input (S1). When the CPU in the controller unit CONT1 detects that there is a log-in input from the panel 112, the MFP 110 reads the log-in input from the panel 112 (S2).

The CPU in the controller unit CONT1 checks the inputted log-in input with log-in account information provided in the MFP 110 (S3), thereby discriminating whether or not a result of the check indicates that they coincide (OK) (S4). If an authentication result indicates that they do not coincide, the processing routine is returned to step S1.

If it is determined in step S4 that the authentication result indicates the coincidence, the MFP 110 further waits for an input (S5) and reads the form type which is inputted from the panel 112 (S6). The CPU in the controller unit CONT1 checks whether or not the read form type has already been registered in the hard disk (HD) 110A of the MFP 110 or the like (S7). The CPU in the controller unit CONT1 discriminates whether or not the check result indicates OK because the form type coincides with the registered one. If it is determined that the form type does not coincide, the processing routine is returned to step S5.

If it is determined in step S8 that the check result indicates OK because the form type coincides with the registered one, the number of pages of the form is derived from the image form file 310 (S9), and the processing routine is finished.

Processes in the MFP 110 when the user allows the document feeder 113 to read the form will now be described with reference to a flowchart shown in FIG. 6.

Figure 6:
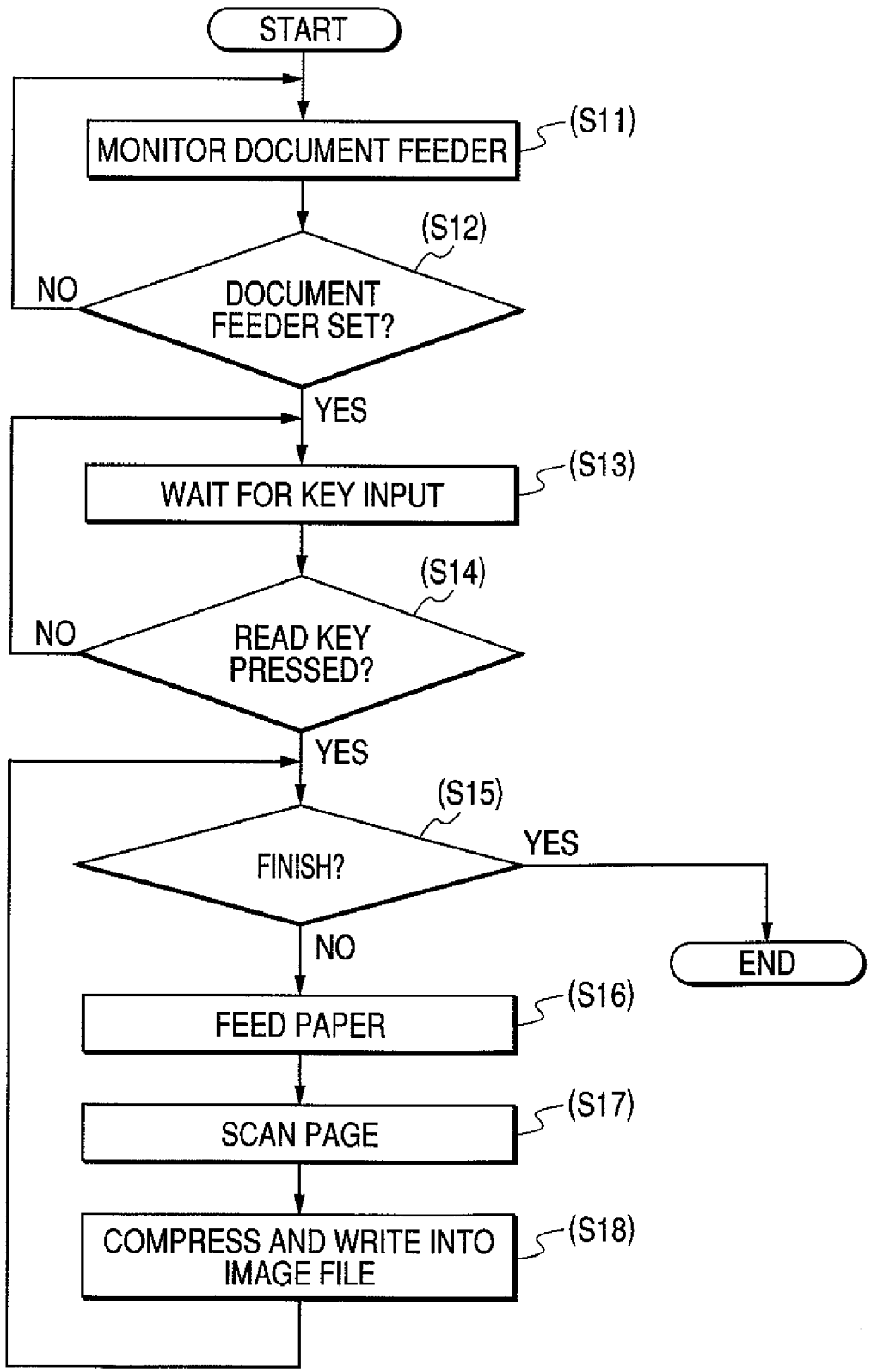
FIG. 6 is a flowchart showing an example of a second data processing procedure in the image reading apparatus according to the embodiment.

FIG. 6 is the flowchart showing an example of the second data processing procedure in the image reading apparatus according to the invention. FIG. 6 corresponds to the processing procedure in the MFP 110 when the user allows the document feeder 113 to read the form. S11 to S18 denote processing steps, respectively. Each processing step is realized when it is executed by the CPU in the controller unit CONT1 of the MFP 110.

First, in the MFP 110, the CPU in the controller unit CONT1 monitors a sensor output state from a sensor (not shown) for detecting whether or not a document (original) has been set to the document feeder 113 (S11). If it is detected that the original has been set to the document feeder 113 (S12), the MFP 110 waits for an input of the key equipped for the panel 112 (S13).

When the CPU in the controller unit CONT1 detects that a read key (not shown) on the panel 112 has been pressed (S14), the CPU in the controller unit CONT1 subsequently discriminates whether or not the scan of all pages of all documents set to the document feeder 113 has been finished (S15). If it is decided that the scan is not finished yet, the processing routine advances to step S16 and subsequent steps. If it is decided that the scan has been finished, the processing routine is finished.

If it is decided in step S15 that the scan is not finished yet, the document feeder 113 feeds the paper page 211 of the form 210 shown in FIG. 2 (S16). The page is scanned by the scanner 111 (S17). The bit map image read by the scanner 111 is compressed and written into the image file 300 (S18) and stored onto, for example, HD 110A. Thereafter, the processing routine is returned to step S15.

In this manner, the batch scan of all of the pages of all of the documents (forms 210, 220, 230, 240, 250, and 260) set to the document feeder 113, the compressing process of the image data, and the like are finished.

Internal processes of the MFP 110 for divisionally transmitting the read image file 300 will now be described with reference to the flowchart of FIG. 7.

Figure 7:
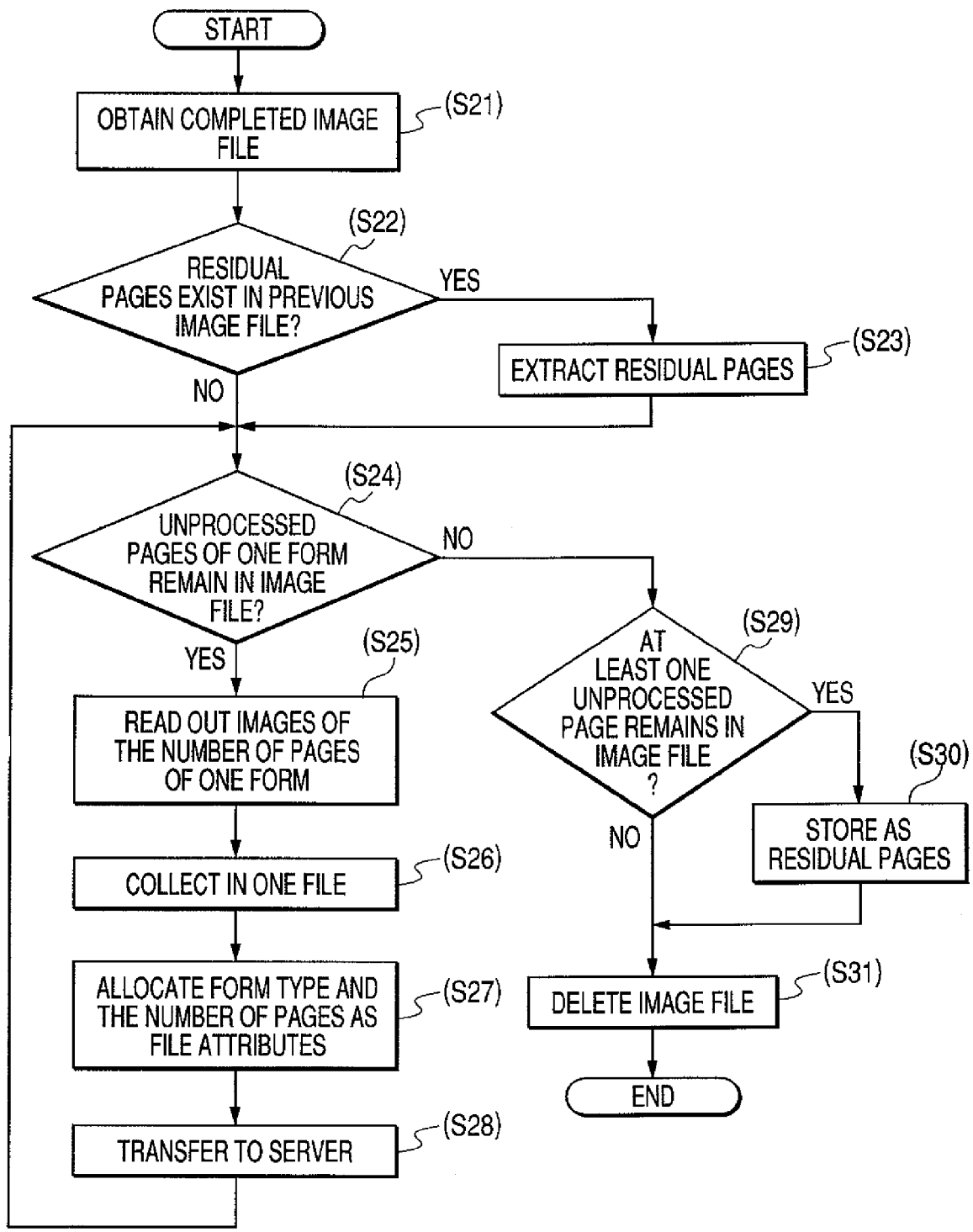
FIG. 7 is a flowchart showing an example of a third data processing procedure in the image reading apparatus according to the embodiment.

FIG. 7 is the flowchart showing an example of the third data processing procedure in the image reading apparatus according to the invention. FIG. 7 corresponds to the processing procedure in the MFP 110 when the read image file 300 is divisionally transmitted. S21 to S31 denote processing steps, respectively. Each processing step is realized when it is executed by the CPU in the controller unit CONT1 of the MFP 110.

First, one image file 300 completed by one continuous reading operation of the document feeder 113 is derived from the HD 110A by the CPU in the controller unit CONT1 (S21). Subsequently, the CPU in the controller unit CONT1 discriminates whether or not there are residual pages in the divisional transmitting process of the previous image file (S22). If it is decided that the residual pages exist, they are extracted (S23). The processing routine advances to step S24.

If it is decided in step S22 that there are no residual pages, the CPU in the controller unit CONT1 discriminates whether or not unprocessed pages of one form exist in the residual pages and the image file 300 (S24). If it is determined that the unprocessed pages of one form exist, the images of the pages of one form are read out of the HD 110A (S25) and collected in one file in accordance with the format shown in FIG. 4 (S26). The CPU in the controller unit CONT1 allocates the form type 502 and the number of pages 503 as attributes of the file to the memory areas of the form type 502 and the number of pages 503 (S27) and transfers them as an image form 310 to the server 120 through the network (S28). The processing routine is returned to step S24. That is, so long as the unprocessed pages of one form remain in the image file 300, the processing routine is returned to step S24 and a processing loop of steps S24 to S28 is repeated.

If it is determined in step S24 that there are no unprocessed pages of one form, the CPU in the controller unit discriminates in step S29 whether or not at least one unprocessed page remains in the image file 300. If it is determined that the residual pages remain although the unprocessed pages of one form do not remain, they are held as residual pages (S30) and step S31 follows.

If it is decided in step S29 that there are no residual pages, the image file 300 is deleted from the HD 110A (S31) and the processing routine is finished.

Internal processes of the server 120 for executing the form recognizing process and the OCR process will now be described with reference to a flowchart of FIG. 8.

Figure 8:
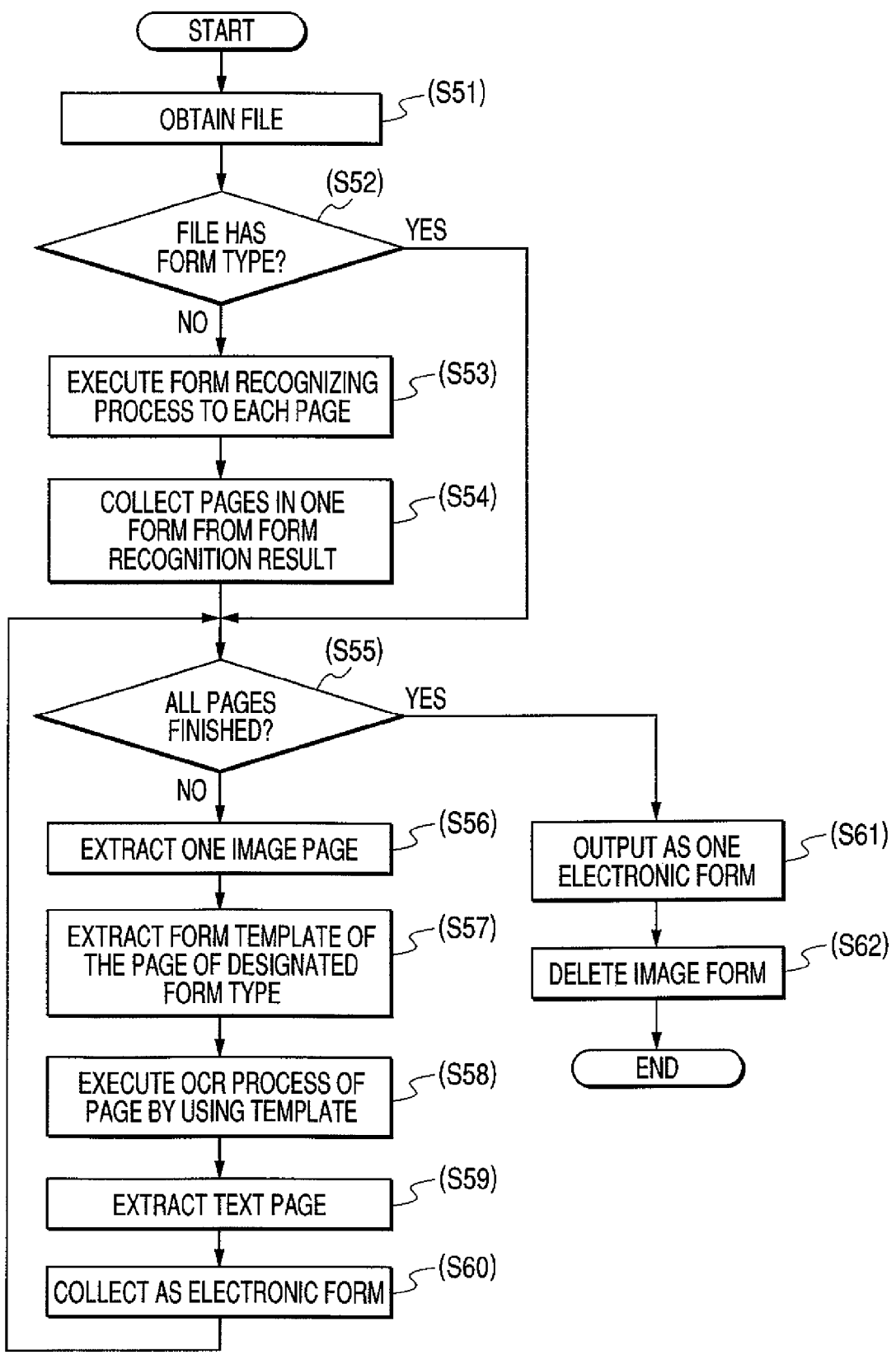
FIG. 8 is a flowchart showing an example of a first data processing procedure in the server apparatus according to the embodiment.

FIG. 8 is the flowchart showing an example of the first data processing procedure in the server apparatus according to the invention. FIG. 8 corresponds to the procedure of the form recognizing process and the OCR process for the image form 310 by the server 120. S51 to S62 denote processing steps, respectively. Each processing step is executed by the CPU and the OCR processing unit 122 in the server 120.

First, the file of the image form 310 transmitted from the MFP 110 through the network as shown in FIG. 1 is obtained (S51). The CPU in the server 120 discriminates whether or not the obtained file has the form type 502 according to the format shown in FIG. 4 (S52). If it is decided that the file does not have the form type 502 or is in a format which does not conform with the format of FIG. 4, the form recognizing process is executed to each page (S53). The pages are collected in one form from a result of the form recognition (S54) and step S55 follows. The processing routine enters the processes of one form unit.

If it is decided in step S52 that the form type is obvious from the image form 310, nothing is executed in particular and the processing routine enters the processes of one form unit in step S55 and subsequent steps.

The CPU in the server 120 discriminates whether or not the processes for all pages have been finished (S55). If it is determined that the processes for all pages are not finished yet, the image page of one page is extracted from one image form 300 (S56). The template of the relevant page of the designated form type 502 is extracted from the form template unit 123 stored in the memory in the server 120 as shown in FIG. 3 (S57). The OCR process is executed to the text area of the page by the OCR processing unit 122 by using the extracted template (S58).

After the templates are extracted as a text page 411 page by page by the OCR process (S59), they are written and added to the electronic form 410 (S60) and the processing routine is returned to step S55.

If it is determined in step S55 that the processes for all pages of one form specified by the number of pages 503 have been finished, they are outputted as one electronic form 410 to the electronic form spooler 124 (S61). The image form 310 obtained from the MFP 110 and held in the work memory is deleted (S62) and the processing routine is finished.

If there is erroneous recognition in the OCR process of this form, the recognition result is manually corrected from the client PC 130 for post edition and approved by the client PC 140 for approval.

The completed electronic form 410 is further sent to the electronic form spooler 124 in the business server 150 (for example, it is held in the hard disk or the like in the server 120) and stored and managed as data which is shared in various forms in accordance with a referring request from the client PC for each business as a form database.

In the case where a plurality of forms of the same format are read out in a lump from the document feeder 113 as mentioned above, in the server 120 which functions as a form recognizing process and an OCR process, the form type 502 can be allocated to the file to be obtained. Therefore, the processes of steps S53 and S54 are unnecessary.

If the number of prepared templates is large, the process for matching the input page with each of all templates is executed, so that the process of step S54 becomes very heavy. Therefore, an effect of reduction of the load which is obtained since such a heavy process can be omitted is large.

In the server 120 for executing the form recognizing process and the OCR process, since the processes are certainly executed on a form unit basis, even if one form is partitioned on the way of the paper set to the document feeder, such a situation that the process is waited until the next reading process is finished is eliminated.

From the above description, a large quantity of documents can be read in a lump by using the document feeder 113, the template of the page for the OCR process can be certainly selected, and the form recognizing process becomes unnecessary. Therefore, the data processing burden of the server 120 is remarkably reduced, the data can be processed at a high speed, and the electronic form 410 can be efficiently stored in the electronic form spooler 124.

Second Embodiment

The first embodiment has been described above with respect to the case where the OCR process is executed to each page of the image form 310 which is obtained from the MFP 110 on the basis of the form type 502 and the number of pages 503 which have previously been registered in the form template unit 123 of the server 120. However, there is a case where an error occurs in the OCR process if the page reading order in the image form differs from the registered page order in the template. Therefore, it is also possible to construct in such a manner that even if a type of form has previously been known, by executing the form recognizing process to all of the pages of the image form 310 which is obtained from the MFP 110 through the network, it is possible to avoid such a situation that upon inputting to the document feeder 113, the user continues the processes without being aware of the state where the order of the pages has been exchanged or another page has been mixed therein on a form unit basis. An embodiment with such a construction will be described hereinbelow.

In the second embodiment, since processes other than the internal processes of the server 120 for executing the form recognizing process and the OCR process are substantially the same as those in the first embodiment, the description regarding the hardware is omitted here.

Figure 9:
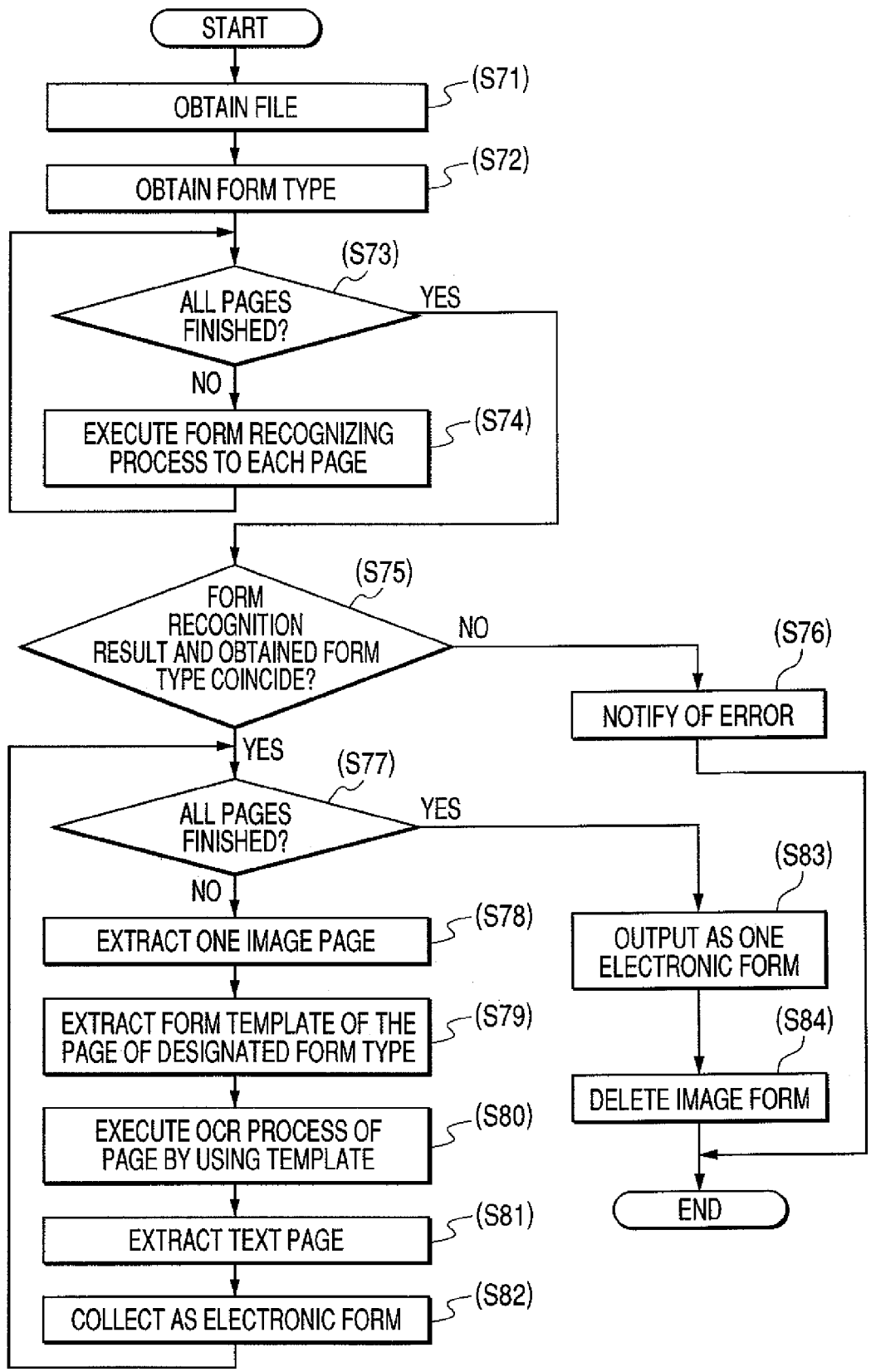
FIG. 9 is a flowchart showing an example of a second data processing procedure in the server apparatus according to the embodiment.

FIG. 9 is a flowchart showing an example of the second data processing procedure in the server apparatus according to the invention. FIG. 9 corresponds to a procedure of the internal processes of the server 120 for executing the form recognizing process and the OCR process. S71 to S84 denote processing steps, respectively.

First, the file of the image form 310 which is transmitted from the MFP 110 through the network is obtained (S71). The form type 502 is obtained in accordance with the format shown in FIG. 4 (S72). The CPU in the server 120 discriminates the end state of all of the pages (S73). If it is determined that the form recognizing process of all pages is not finished yet, the form recognizing process is executed to each page (S74) and the processing routine is returned to step S73.

If it is determined in step S73 that the processes of all pages of one form have been finished, the CPU in the server 120 compares the form recognition result with the obtained form type 502, thereby discriminating whether or not they coincide (S75). If it is determined that the pages which do not coincide have been found, the CPU notifies the client PC 130 for post edition or the client PC 140 for approval of an error (S76). A message showing such an error notification is displayed on a display apparatus of the client side and the processes of the present form are finished.

The CPU in the server 120 discriminates the end state of all of the pages (S77). If it is determined that the processes of all pages are not finished yet, the images of one page are extracted from one image form (S78). The template of the relevant page of the designated form type is extracted from the form template unit 123 (S79). The OCR process of the page is executed by the OCR processing unit 122 by using this template (S80).

After the images are extracted as a text page 411 on a page unit basis by the OCR process of the OCR processing unit 122 (S81), they are written and added to the electronic form 410 (S82) and the processing routine is returned to step S77.

If it is determined in step S77 that the processes for all pages of one form have been finished, they are outputted as one electronic form 410 to the electronic form spooler 124 (S83). The image form 310 obtained from the MFP 110 is deleted from the work (S84) and the processing routine is finished.

As mentioned above, even if the type of form has previously been known, by executing the form recognizing process to all of the pages, it is possible to avoid such a situation that upon inputting to the document feeder, the user continues the processes without being aware of the state where the order of the pages has been exchanged or another page has been mixed therein.

In this case, although the load on the data processes by the server 120 cannot be reduced because of the existence of the form recognizing process, the user can select the desired function by the trade-off of the processing speed and the error process, so that ease of use of the user is improved.

From the above description, the system in which, if there is a surplus of the processing speed of the server, a mistake in the input in the document feeder can be easily found by checking the form by the form recognizing process can be provided. The image processing system having excellent ease of use can be constructed.

According to the embodiment, it is possible to provide the system in which a large quantity of documents can be read in a lump by using the document feeder, the template of the page for the OCR process can be certainly selected, the load on the server can be reduced, and the processes can be executed at a higher speed.

The system in which, if there is a surplus of the processing speed of the server, a mistake in the input in the document feeder can be easily found can be provided.

Third Embodiment

The first embodiment has been described above with respect to the case where after the image file 300 was completed, the divisional transmitting process is executed in the MFP 110. However, if the number of pages of the form to be read is large, since it will be a waste of time, it is also possible to construct in such a manner that before the image file 300 is completed, the pages are read out and the divisional transmitting process is executed. An embodiment with such a construction will be described hereinbelow.

In the third embodiment, since processes other than the internal processes of the MFP 110 for executing the user log-in process and the process for reading from the document feeder 113 are substantially the same as those in the first embodiment, their description is omitted here.

Figure 10:
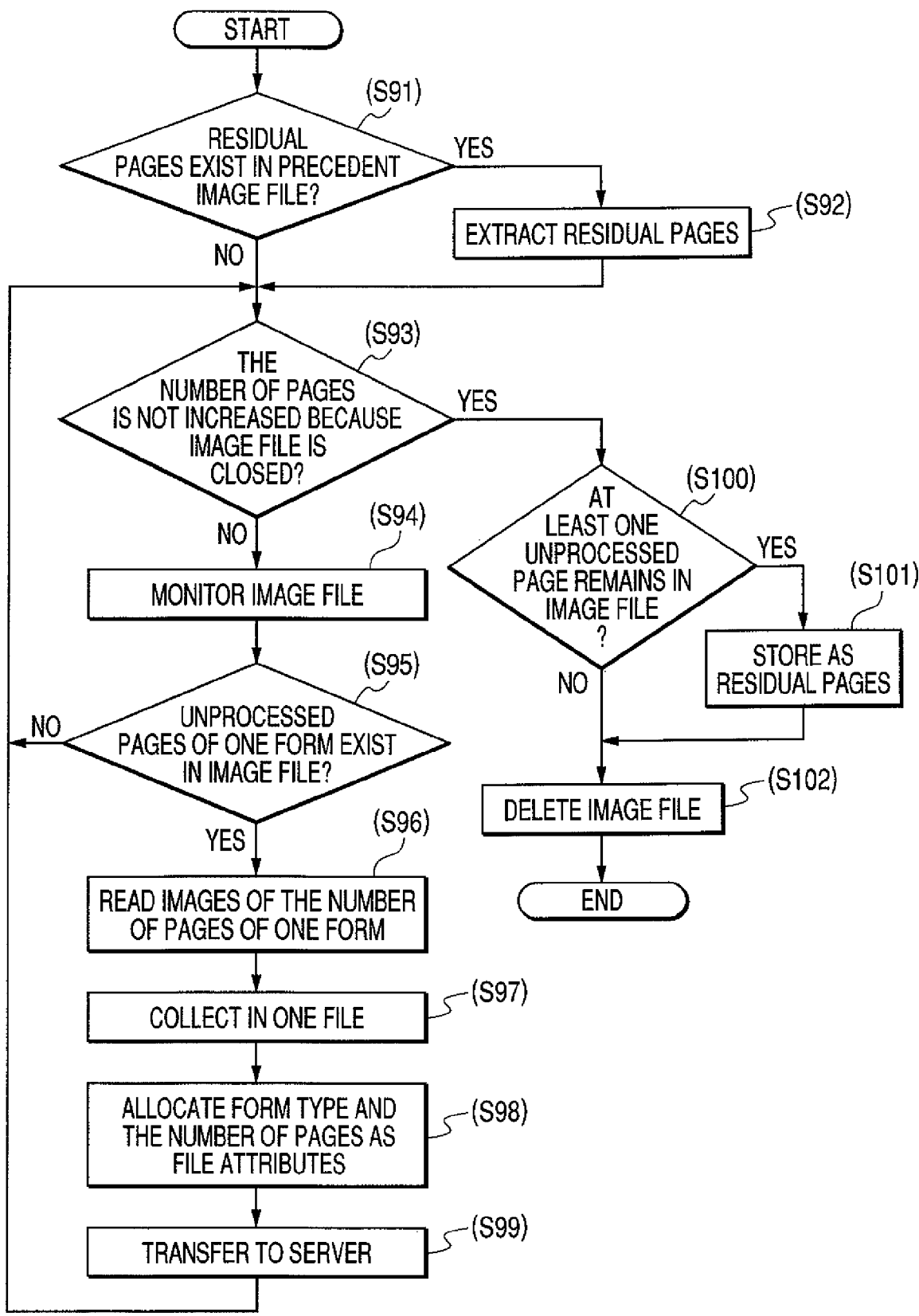
FIG. 10 is a flowchart showing an example of a fourth data processing procedure in the image reading apparatus according to the embodiment.

FIG. 10 is a flowchart showing an example of the fourth data processing procedure in the image reading apparatus according to the invention. FIG. 10 corresponds to a procedure of the internal processes of the MFP 110 for divisionally transmitting the read image file 300. S91 to 102 denote processing steps, respectively. Each processing step is realized when it is executed by the CPU in the controller unit CONT1 of the MFP 110.

First, one continuous reading operation of the document feeder 113 is started and the dividing process is started simultaneously with that one image file 300 is formed on the HD 110A. At this point of time, no pages are written yet in the image file 300.

The CPU in the controller unit CONT1 discriminates whether or not the residual pages exist in the divisional transmitting process of the previous image file (S91). If it is decided that the residual pages exist, they are extracted (S92). If there are no residual pages, nothing is executed but the processing routine advances to step S93.

The CPU in the controller unit CONT1 discriminates whether or not the image file 300 has already been closed and is in the state where no more pages are increased (S93). If it is in the state where the pages are still increased, it is monitored that the pages are accumulated (S94). If the pages are increased and the unprocessed pages of one form are accumulated (S95), the images of the pages of one form are read out (S96). If the unprocessed pages of one form are not accumulated for a predetermined time in step S95, the processing routine is returned to step S93 and this processing loop is repeated.

The unprocessed pages of one form which were read out in step S96 are collected in one file (S97). The CPU in the controller unit CONT1 allocates the form type 502 and the number of pages 503 as attributes of the file to the memory areas of the form type 502 and the number of pages 503 (S98) and transfers them as an image form 310 to the server 120 through the network (S99). The processing routine is returned to step S93. That is, so long as the unprocessed pages of one form remain in the image file 300, the processing routine is returned to step S93 and the processing loop is repeated.

If it is decided in step S95 that there are no unprocessed pages of one form and if it is detected in step S93 that no more pages are increased, the CPU in the controller unit discriminates whether or not at least one page remains in the unprocessed image file 300 (S100). If the residual pages exist although no unprocessed pages of one form remain, they are stored as residual pages (S101) and the processing routine advances to step S102.

If it is detected in step S100 that there are no residual pages, the image file 300 is deleted from the HD 110A (S102) and the processing routine is finished.

As mentioned above, by starting the divisional transmitting process without waiting for the completion of the image file 300, the divisional transmitting process can be also started during the reading process. Further, the form recognizing process and the OCR process in the server 120 can be also started.

When comparing with the operating speed of the document feeder 113 whose physical restriction is large, the divisional transmitting process, the form recognizing process, and the OCR process which depend on the speed of the CPU whose processing speed has remarkably been raised can be simultaneously executed, so that the processing speed of the whole system is improved.

From the above description, the system in which by starting the divisional transmitting process without waiting for the completion of the image file 300, the form recognizing process and the OCR process can be simultaneously executed and the process can be executed at a higher speed can be provided.

According to the embodiment, it is possible to provide the system in which a large quantity of documents can be read in a lump by using the document feeder, the template of the page for the OCR process can be certainly selected, the load on the server can be reduced, and the processes can be executed at a higher speed.

Fourth Embodiment

The first embodiment has been described above with respect to the case where the user checks all originals to be read in the MFP 110 and discriminates whether each original is the simplex document or the duplex document and the document feeder is made operative in accordance with the discrimination result. However, if it is preliminarily obvious that the form original is certainly the simplex document or the duplex document or that the simplex form original and the duplex form original have been mixed on a form unit basis, it is also possible to construct in such a manner that information showing such a distinction is recorded in form pattern information and used for the operation of the document feeder. Further, if the pages whose OCR process is unnecessary are included in the originals or the scan mode suitable for the OCR process can be previously discriminated on a page unit basis, it is also possible to construct in such a manner that information showing such a fact is recorded in the form pattern information and used for the process. An embodiment with such a construction will be described hereinbelow.

Since the divisional transmitting process of the MFP 110 and the processes of the server 120 in the fourth embodiment are substantially the same as those in the first embodiment, their description is omitted here.

Figure 11:
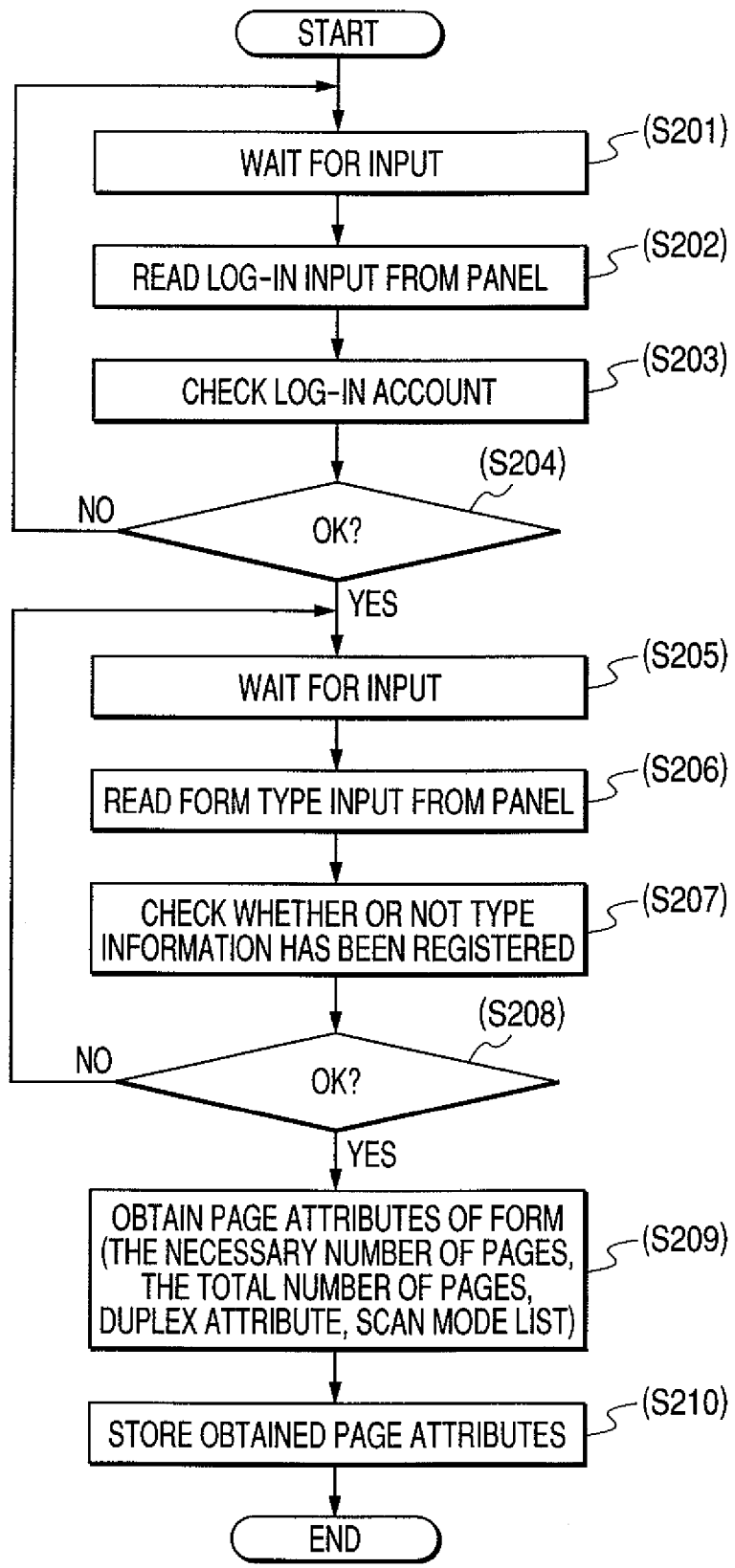
FIG. 11 is a flowchart showing an example of a fifth data processing procedure in the image reading apparatus according to the embodiment.

FIG. 11 is a flowchart showing an example of the fifth data processing procedure in the image reading apparatus according to the invention. FIG. 11 corresponds to a procedure of the internal processes of the MFP 110 when the user logs in from the client PC 140. S201 to 210 denote processing steps, respectively. Each processing step is realized when it is executed by the CPU in the controller unit CONT1 of the MFP 110.

If nothing is executed in particular, the MFP 110 waits for the input (S201). When the CPU in the controller unit CONT1 detects that there is a log-in input from the panel 112, the MFP 110 reads the log-in input from the panel 112 (S202).

The CPU in the controller unit CONT1 checks the log-in input which is inputted with the log-in account information provided therein (S203), thereby discriminating whether or not a result of the check indicates the coincidence (OK) (S204). If the authentication result indicates that they do not coincide, the processing routine is returned to step S201.

If it is determined in step S204 that the authentication result indicates the coincidence, the MFP 110 further waits for the input (S205) and reads the form type which is inputted from the panel 112 (S206). The CPU in the controller unit CONT1 discriminates whether or not the read form type has been registered in the HD 110A or the like of the MFP 110 (S207). The CPU in the controller unit CONT1 discriminates whether or not the form type coincides with the registered one and the check result indicates OK (S208). If it is determined that they do not coincide, the processing routine is returned to step S205.

The form type has been registered in the HD 110A in the format in the form pattern information table 320 in FIG. 12.

If it is determined in step S208 that the form type coincides with the registered one and the check result indicates OK, the necessary number of pages, the total number of pages, a duplex (duplex printing) attribute, and a scan mode list are obtained from the form pattern information table on the basis of the form type (S209) and further stored (S210) and the processing routine is finished.

FIG. 12 is a diagram showing an example of the form pattern information table 320 shown in FIG. 2.

As shown in FIG. 12, in the embodiment, the necessary number of pages, the total number of pages, the duplex attribute, the scan mode list, and the like have been stored in the form pattern information table 320 every form type.

The processes in the MFP 110 when the user allows the form to be read out from the document feeder 113 will now be described with reference to a flowchart of FIG. 13.

Figure 13:
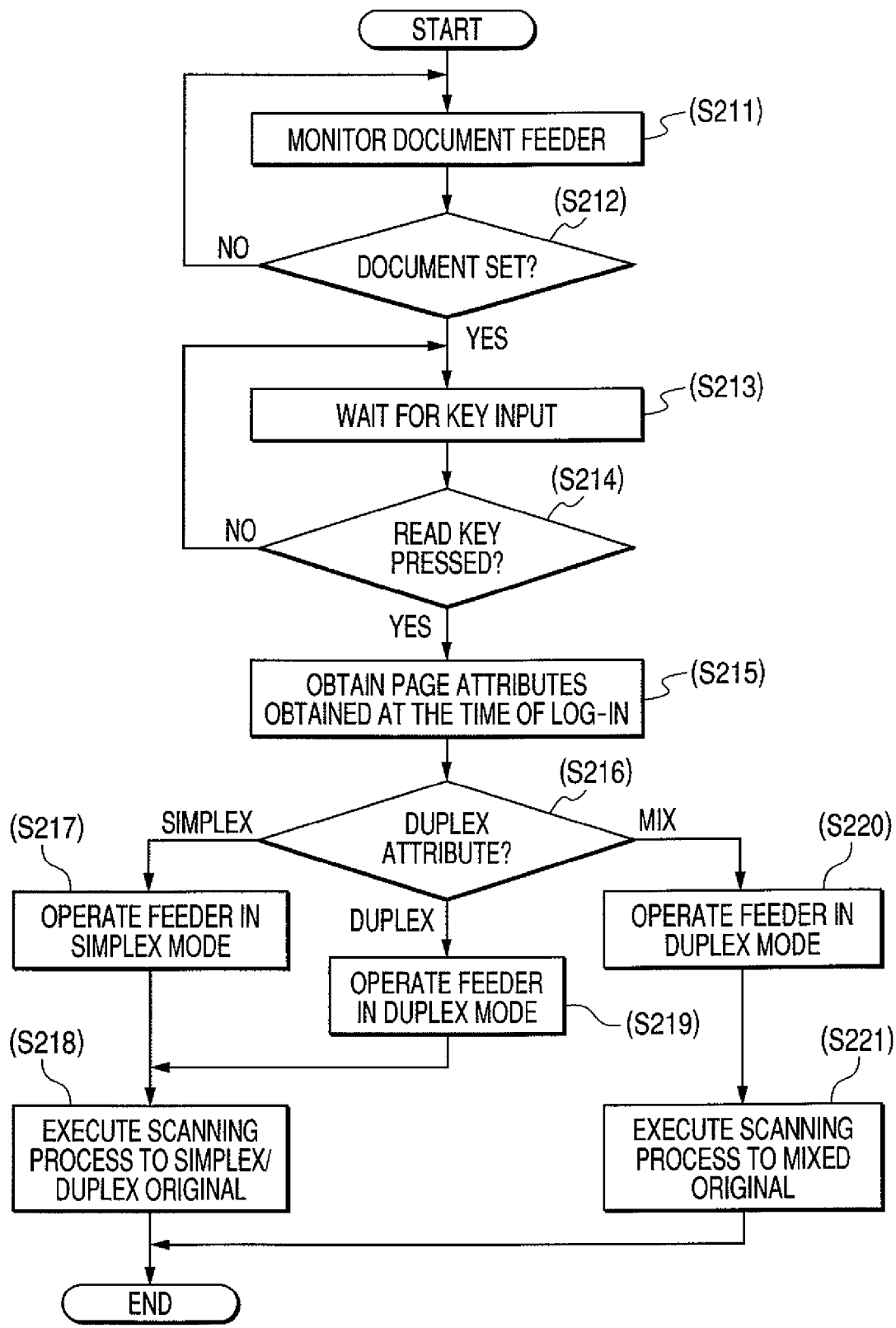
FIG. 13 is a flowchart showing an example of a sixth data processing procedure in the image reading apparatus according to the embodiment.

FIG. 13 is the flowchart showing an example of the sixth data processing procedure in the image reading apparatus according to the invention. FIG. 13 corresponds to a processing procedure in the MFP 110 when the user allows the form to be read out from the document feeder 113. S211 to S221 denote processing steps, respectively. Each processing step is realized when it is executed by the CPU in the controller unit CONT1 of the MFP 110.

First, the CPU in the controller unit CONT1 of the MFP 110 monitors a state of a sensor output from a sensor (not shown) to detect whether or not the document has been set to the document feeder 113 (S211). If it is detected that the document has been set to the document feeder 113 (S212), the MFP 110 waits for the input of the key equipped for the panel 112 (S213).

When the CPU in the controller unit CONT1 detects that the read key (not shown) of the panel 112 has been pressed (S214), the page attribute stored by the first data processing procedure is obtained (S215). If its duplex attribute indicates the simplex, the operation of the document feeder 113 is set so as to read only one side of the original (S217), the scanning process of the original is executed (S218), and the processing routine is finished.

If it is decided in step S216 that the duplex attribute indicates the duplex, the operation of the document feeder 113 is set so as to read both sides of the original (S219), the scanning process of the original is executed in a manner similar to the case of the simplex (S218), and the processing routine is finished.

Further, if it is decided in step S216 that the page attribute indicates the mixture, the operation of the document feeder 113 is set so as to read both sides of the original (S220), the scanning process in the case where the simplex original and the duplex original mixedly exist is executed (S221), and the processing routine is finished.

The scanning process of step S218 in FIG. 13 will now be described in more detail in accordance with a flowchart shown in FIG. 14.

Figure 14:
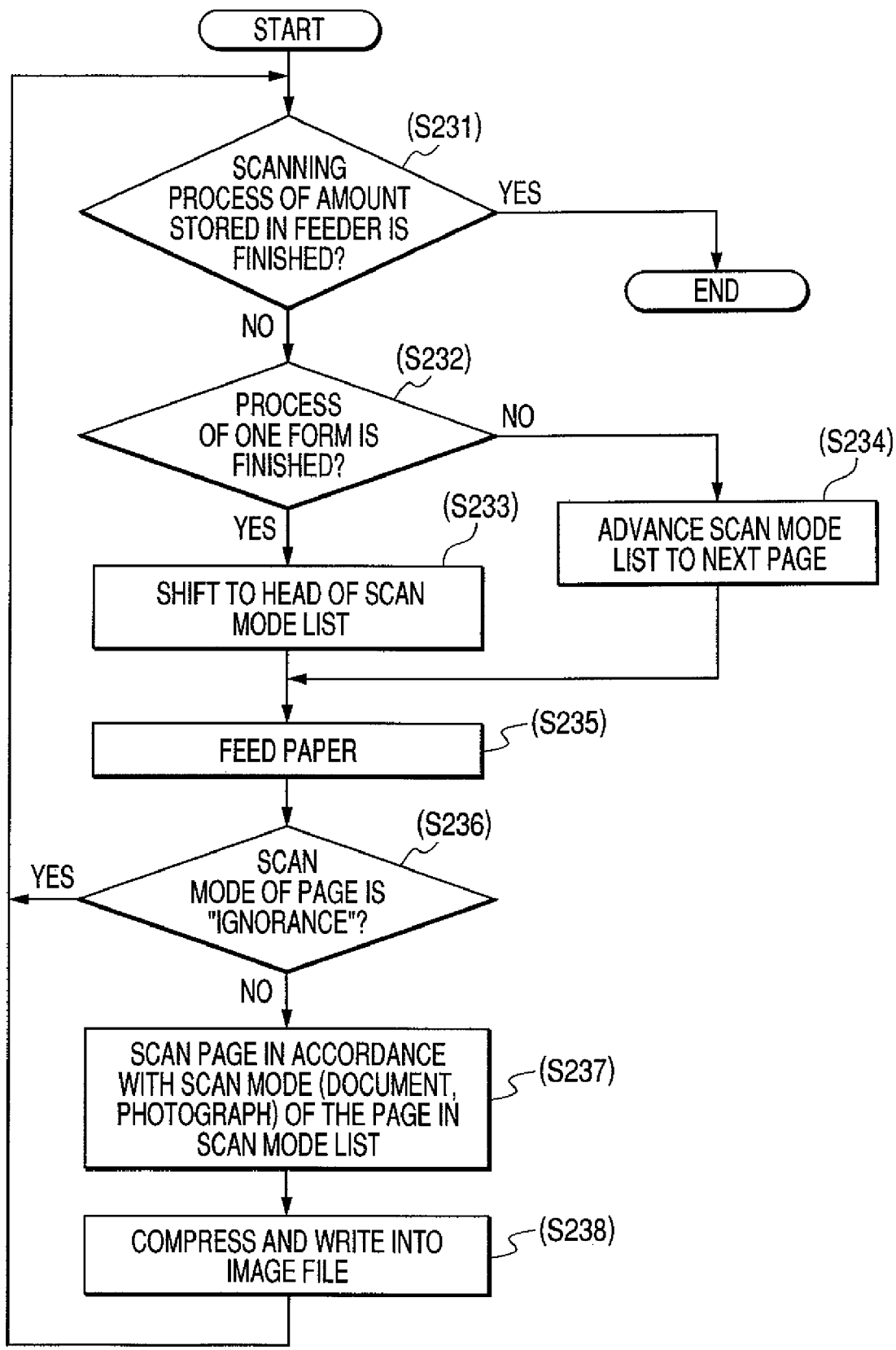
FIG. 14 is a flowchart showing an example of a seventh data processing procedure in the image reading apparatus according to the embodiment.

FIG. 14 is the flowchart showing an example of the seventh data processing procedure in the image reading apparatus according to the invention. FIG. 14 corresponds to a processing procedure in the MFP 110 when the user allows the form to be read out from the document feeder 113 and corresponds to a detailed procedure of the scanning process of step S218 in FIG. 13. S231 to S238 denote processing steps, respectively. Each processing step is realized when it is executed by the CPU in the controller unit CONT1 of the MFP 110.

First, the system enters the process to read a series of documents by the document feeder 113. The CPU in the controller unit CONT1 discriminates whether or not the scanning processes of the documents set to the feeder have been finished (S231). If it is decided that they have been finished, the processing routine is finished.

In step S231, first, since it is determined that the process of any one of the forms is not executed yet, the processing routine advances to step S232. The CPU in the controller unit CONT1 discriminates whether or not the scanning processes of one form have been finished (S232). If it is decided that they have been finished, a head of the scan mode list of the page attribute is referred to (S233). The paper is fed (S235) and the CPU in the controller unit CONT1 discriminates whether or not the scan mode of the reference destination side is "ignore" (S236). If it is decided that it is "ignore", the scanning process is not executed but the processing routine is returned to step S231.

If it is decided in step S236 that scan mode of the reference destination side is not "ignore", the first page is scanned in accordance with the operation of "document" or "photograph" as such a mode (S237). A result is compressed and written into the image file 300 (S238) and the processing routine is returned to step S231.

In step S231, if the paper feeding operation of all of the documents set to the document feeder 113 has been finished, the processing routine is finished. If it is decided that the paper feeding operation of all of the documents is not finished yet, step S232 follows and the processing routine is continued.

If it is determined in step S232 that the process of one form is not finished yet, the reference destination side on the scan mode list is advanced to the next page (S234), and the processing routine advances to step S235. The processing in steps S235-S238 is repeated, until the process of one form is finished. If it is determined in step S232 that the process of one form is finished, the processing routine advances to step S233.

In this manner, the batch scan of all pages of all documents (forms 210, 220, 230, 240, 250, and 260) set to the document feeder 113, the compressing process of the image data, and the like are finished.

From the above description, it will be understood that when the duplex attribute indicates the simplex or duplex, the pages necessary for the OCR process are enclosed in the image file 300 as a result obtained by scanning the documents in the expected scan mode. Further, it will be understood that by dividing the documents on the basis of the necessary number of pages, the image file 300 which is sent to the server is formed every form.

The scanning process of step S221 in FIG. 13 will now be described in more detail in accordance with a flowchart shown in FIG. 15.

Figure 15:
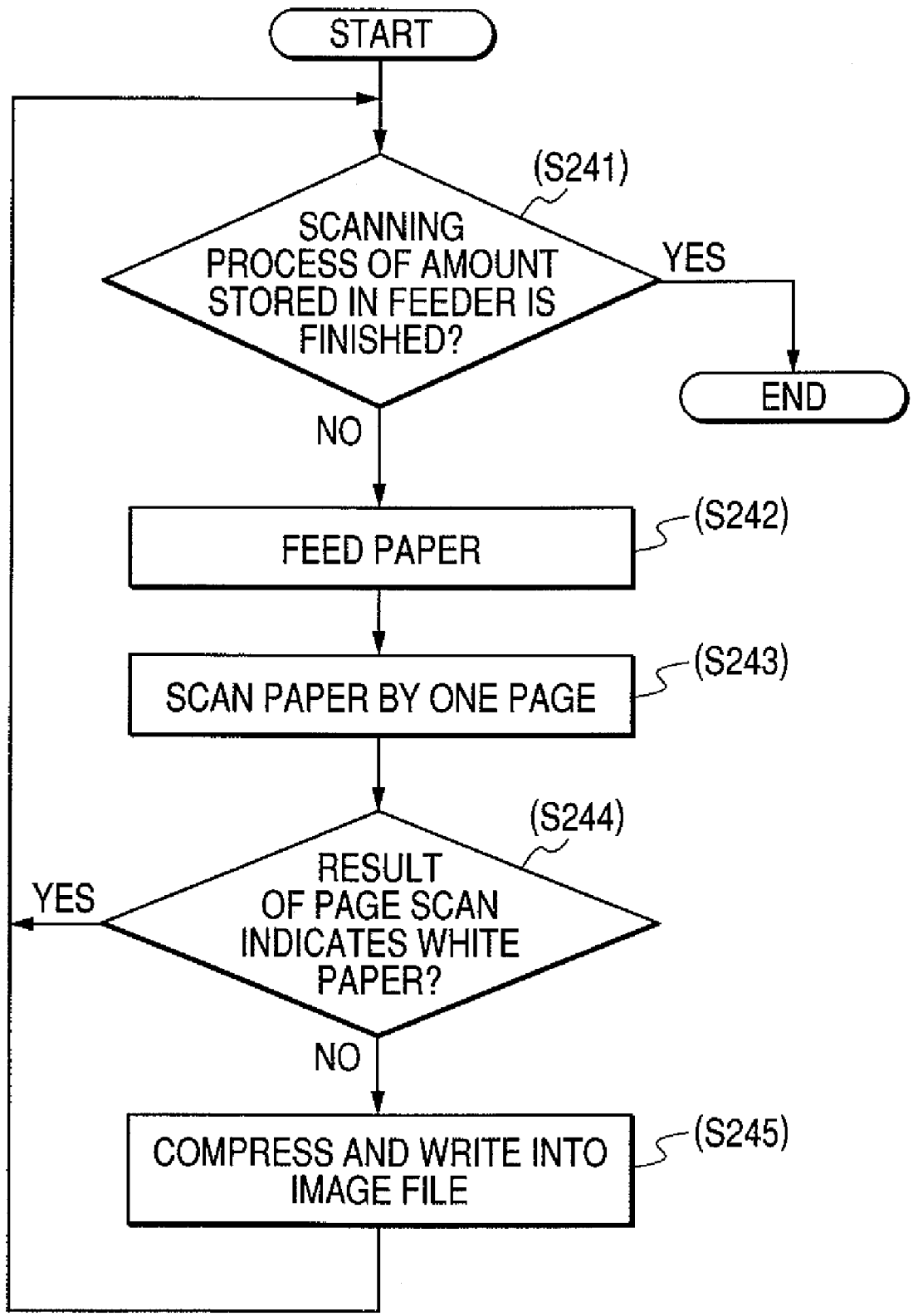
FIG. 15 is a flowchart showing an example of an eighth data processing procedure in the image reading apparatus according to the embodiment.

FIG. 15 is a flowchart showing an example of the eighth data processing procedure in the image reading apparatus according to the invention. FIG. 15 corresponds to a processing procedure in the MFP 110 when the user allows the form to be read out from the document feeder 113 and corresponds to a detailed procedure of the scanning process of the mixed original in step S221 in FIG. 13. S241 to S245 denote processing steps, respectively. Each processing step is realized when it is executed by the CPU in the controller unit CONT1 of the MFP 110.

First, the system enters the process to read the series of documents by the document feeder 113. The paper is fed by the document feeder 113 (S242) and one page is scanned (S243). At this time, since the duplex reading mode has been set in step S220 shown in FIG. 13, the page is certainly scanned in the duplex mode.

Whether or not a result of the scan of the page indicates the white page is discriminated (S244). If it is determined that it indicates the white page, the processing routine is returned to step S241 without storing such a page anywhere.

If it is determined in step S244 that it is not the white page, such a page is compressed (a compressing process is executed by the CPU in the controller unit CONT1 of the MFP 110) and written into the image file 300.

By repeating the above series of processes, if the paper feeding operation of all of the documents set to the document feeder 113 is finished, the processing routine is finished.

In this manner, the batch scan of all pages of all documents (forms 210, 220, 230, 240, 250, and 260) set to the document feeder 113, the compressing process of the image data, and the like are finished.

From the above description, it will be understood that when the duplex attribute indicates the mixture, the pages necessary for the OCR process are enclosed in the image file 300. Further, it will be understood that by dividing the documents on the basis of the necessary number of pages, the image file 300 which is sent to the server is formed every form.

How the page of each original set to the document feeder 113 is sent as an image form 310 to the server will be specifically explained as an example hereinbelow with reference to FIGS. 12, 16, and 17.

Figure 16:
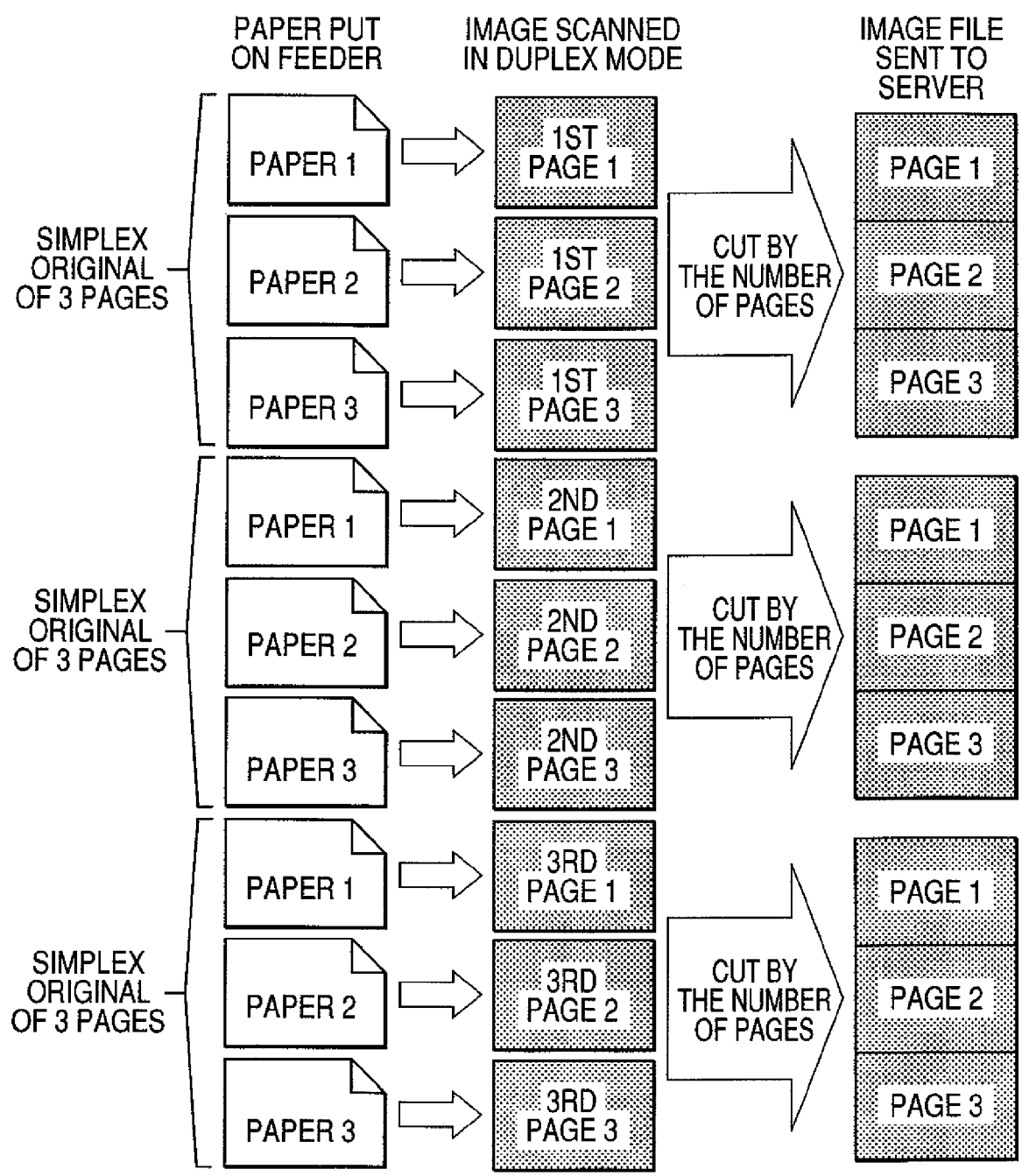
FIG. 16 is a schematic diagram showing an example of a relation between a simplex form original and the image form file in the image reading apparatus according to the embodiment.

FIG. 16 is a schematic diagram showing an example of a relation between the simplex form original and the image form file in the image reading apparatus according to the invention. A page construction of the designated form is set as follows: the necessary number of pages is equal to 3; the total number of pages is equal to 3; the duplex attribute indicates the simplex; and the scan mode list is "document-document-photograph". FIG. 16 corresponds to the case where three form originals have been set to the document feeder 113. This form corresponds to the form C in the form pattern information table 320 in FIG. 12.

As described in the flowchart of FIG. 13, if the duplex attribute indicates the simplex, since the document feeder 113 always scans one side, the simplex scan of nine pages is executed from the nine form originals shown at the left column in FIG. 16. Thus, the scan results of the number as many as nine pages are obtained as shown at the center column in FIG. 16.

Since the scan mode list is "document-document-photograph", in total, the third, sixth, and ninth pages are scanned in the photograph mode and other pages are scanned in the document mode. They are written in the image file 300.

Further, since both of the necessary number of pages and the total number of pages are equal to 3, the images are divided every three pages from the head and three image forms 310 each constructed by three pages are formed as shown at the right column.

Figure 17:
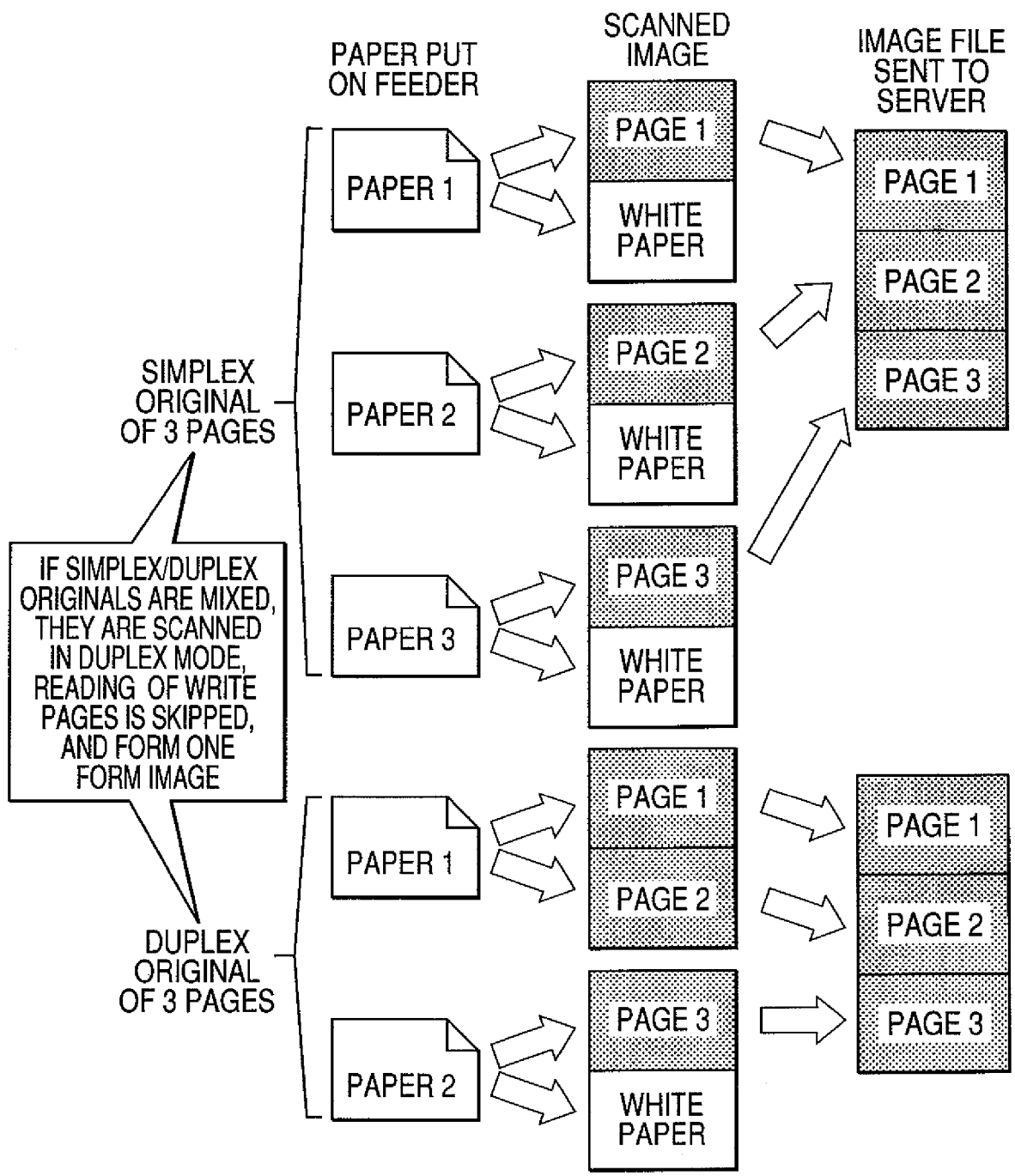
FIG. 17 is a schematic diagram showing an example of a relation between a mixed form original and the image form file in the image reading apparatus according to the embodiment.

FIG. 17 is a schematic diagram showing an example of the relation between the mixed form original and the image form file in the image reading apparatus according to the invention. A page construction of the designated form is set as follows: the necessary number of pages is equal to 3; the total number of pages is equal to 3; and the duplex attribute indicates the mixture. FIG. 17 corresponds to the case where a bundle of simplex form originals and a bundle of duplex form originals have successively been set to the document feeder 113. This form corresponds to the form D in the form pattern information table 320 in FIG. 12.

As described in the flowchart of FIG. 13, if the duplex attribute indicates the mixture, since the document feeder 113 always scans both sides, the duplex scan of ten pages is executed from the five form originals shown at the left column in FIG. 17. Thus, the scan results of the number as many as ten pages are obtained as shown at the center column.

As described in the flowchart of FIG. 14, since only the pages other than the white pages are written in the image file 300, six color pages remain. Further, since both of the necessary number of pages and the total number of pages are equal to 3, the images are divided every three pages from the head and two image forms 310 each constructed by three pages are formed as shown at the right column.

From the above description, even in the case where the simplex printed form and the duplex printed form each comprising the same number of pages mixedly exist, it will be understood that if the back sides of the originals are the white pages, when the OCR process is executed, each form can be handled as one file comprising the same number of pages.

A construction of a data processing program which can be read out by the image processing system to which the image reading apparatus and the server apparatus according to the embodiment can be applied will be described hereinbelow with reference to memory maps shown in FIGS. 18 and 19.

FIG. 18 is a diagram for explaining the memory map of a storing medium for storing various data processing programs which can be read out by the image processing system to which the image reading apparatus according to the embodiment can be applied. FIG. 19 is a diagram for explaining the memory map of a storing medium for storing various data processing programs which can be read out by the image processing system to which the server apparatus according to the embodiment can be applied.

Although not particularly shown, there is also a case where information to manage a program group which is stored in the storing medium, for example, version information, implementor, and the like are also stored, and information which depends on the OS or the like of the program reading side, for example, icons or the like to identify and display the programs are also stored.

Further, data belonging to the various programs is also managed in the directory. There is also a case where a program to install the various programs into a computer and, if the program to install has been compressed, a program for decompressing it, and the like are also stored.

The functions shown in FIGS. 5, 6, 7, 8, 9, 10, 11, 13, 14, and 15 in the embodiment can be executed by a host computer by a program which is installed from the outside. In such a case, the invention is also applied to the case where an information group including the programs is supplied to an output apparatus by a storing medium such as CD-ROM, flash memory, FD, or the like or from an external storing medium through the network.

As mentioned above, naturally, the objects of the invention are also accomplished by a method whereby the storing medium in which program codes of software to realize the functions of the embodiments mentioned above have been recorded is supplied to a system or an apparatus and a computer (or a CPU or an MPU) of the system or apparatus reads out and executes the program codes stored in the storing medium.

In such a case, the program codes themselves read out of the storing medium realize the novel functions of the invention and the storing medium in which the program codes have been stored constructs the invention.

Therefore, a form of the program is not limited but any of object codes, a program which is executed by an interpreter, script data which is supplied to the OS, and the like can be used so long as they have the functions of the programs.

As a storing medium to supply the programs, for example, a flexible disk, a hard disk, an optical disk, a magnetooptic disk, an MO, a CD-ROM, a CD-R, a CD-RW, a magnetic tape, a non-volatile memory card, a ROM, a DVD, or the like can be used.

In this case, the program codes themselves read out of the storing medium realize the functions of the embodiments and the storing medium in which the program codes have been stored constructs the invention.

As another program supplying method, it can be also supplied by a method whereby the client computer is connected to Homepage of the Internet by using the browser of the client computer and the computer program itself of the invention or a compressed file including the automatic installing function is downloaded from Homepage to a recording medium such as a hard disk or the like. The program supplying method can be also realized by a method whereby the program codes constructing the program of the invention are divided into a plurality of files, and each file is downloaded from different Homepage. That is, a WWW server, an ftp server, or the like for downloading the program file to realize the function processes of the invention by the computer to a plurality of users is also incorporated to Claims of the invention.

The program supplying method can be also realized by a method whereby the program of the invention is encrypted, stored into the storing medium such as a CD-ROM or the like, distributed to the users, the users who can satisfy predetermined conditions are allowed to download key information for decrypting the encryption from Homepage through the Internet, the encrypted program is executed by using the key information, and the program is installed to the computer.

Naturally, the invention incorporates not only the case where the computer executes the read-out program codes, so that the functions of the embodiments mentioned above are realized but also the case where the an OS (operating system) or the like which is operating on the computer executes a part or all of the actual processes on the basis of instructions of the program codes, and the functions of the embodiments mentioned above are realized by those processes.

Further, naturally, the invention incorporates the case where the program codes read out of the storing medium are written into a memory provided for a function expanding board inserted in the computer or a function expanding unit connected to the computer, thereafter, a CPU or the like provided for the function expanding board or the function expanding unit executes a part or all of the actual processes on the basis of instructions of the program codes, and the functions of the embodiments mentioned above are realized by those processes.

The invention is not limited to the foregoing embodiments but many modifications (including an organic combination of the embodiments) based on the spirit of the invention are possible and they are not excluded from the scope of the invention.

Although the invention has been described with respect to the various examples and embodiments, the persons with ordinary skill in the art will understand that the spirit and scope of the invention are not limited to the specific explanation in the specification but the following embodiments are also incorporated.

There is disclosed the image reading apparatus which can transfer image information obtained by reading the form original to the server apparatus through the network, comprising: the form information storing means (for example, the HD 110A shown in FIG. 2) for storing the types of form originals to be read and the page construction information of each form; the designating means (for example, the panel 112) for designating the type of form original to be read; the scanning means (the scanner 111 shown in FIG. 2) for scanning the form originals of a plurality of print copies in a lump on a page unit basis and outputting the form original images; the forming means (by the controller unit CONT1 shown in FIG. 2) for forming the form image file by collecting the form original images which are scanned in a lump by the scanning means on the basis of the page construction information stored in the form information storing means on the basis of the type of form original which is designated by the designating means; and the transmitting means (the controller unit CONT1 shown in FIG. 2 transmits to the server 120 through the network connected to the network controller) for transmitting the form image file which is formed by the forming means to the server.

Thus, by executing the image reading process in a lump to a plurality of bundles of form originals without considering a break or the like of the form original bundles which are inputted, the reading processing efficiency can be improved. Since the read form image is automatically divided on the basis of the number of pages registered by the designated form type and one form data is produced, such a situation that the form image file is transmitted to the server apparatus in the state where the break of the form image has been mixed to another form image can be certainly prevented.

There is disclosed the image reading apparatus according to the embodiment 1, wherein the page construction information of each form includes the number of pages which are actually necessary, the total number of pages, the page size of each page, the duplex attribute, and the list of each page scan mode.

Thus, since the construction of the form originals can be freely edited, even if the form originals of various sizes mixedly exist, the form original reading operation which accurately recognizes the break of each form can be correctly executed.

it is preferable if the forming means can allocate the form type, the number of pages, and the form image to the form data.

Thus, the character recognizing process is executed without executing the form recognizing process of the form image while notifying the server apparatus of the form type and the number of pages and the electronic form forming efficiency can be remarkably improved.

The forming means may be constructed so that it can recognize whether or not the original image scanned by the scanning means is the white page.

Thus, the white page can be removed from the scanned original image and the form original reading operation which accurately recognizes the break of each form can be correctly executed.

The page construction information of each form can be downloaded from the data processing apparatus through the network.

Thus, the details of the page construction information of each form can be obtained from the data processing apparatus and accurately inputted to the image processing apparatus.

The duplex attribute of the page construction information of each form may have attribute values of simplex, duplex, and mixture.

Thus, the operation to instruct the surface to be scanned upon scanning of the original can be omitted and the operation load can be reduced.

The scan mode list of the page construction information of each form may be a list having attribute values of the document mode, photograph mode, and ignore mode on a page unit basis.

Thus, the scanning method can be changed on a page unit basis upon scanning of the original and the precision of the character recognition is improved. Since the vain pages are not formed, the electronic form forming efficiency can be remarkably improved.

There is disclosed the server apparatus which can obtain the form data which is formed by the image reading apparatus through the network, comprising: the template storing means (the form template unit 123 shown in FIG. 3) for storing the template showing the form construction to be subjected to the character recognizing process every form type; the character recognition processing means (the OCR processing unit 122 shown in FIG. 3) for executing the character recognizing process to each page of the form data on the basis of the template which is specified from the template storing means in accordance with the form type which is allocated to the form data; and the file forming means (the OCR processing unit 122 shown in FIG. 3) for forming the text data of each page, as an electronic form file, which is recognized by the character recognition processing means.

Thus, the character recognizing process of each form data can be executed without executing the form recognizing process to the form data, the processing time which is required until the final electronic form is formed can be remarkably reduced, and the burden of the recognizing process on the server apparatus side can be remarkably reduced.

There is disclosed the server apparatus comprising: the form recognizing means (the OCR processing unit 122 shown in FIG. 3) for performing the form recognition of each page of the form data; and the notifying means (the controller unit CONT2 shown in FIG. 2 notifies the client PC 130 or the like shown in FIG. 1 through the network connected to the network controller (not shown)) for notifying of the form error when the form recognition result of each page which is recognized by the form recognizing means does not coincide with the form type stored in the template storing means.

Thus, by discriminating whether or not each page of the form data which is obtained coincides with the registered form type, the case where the order of the pages in the form originals has been changed and read by the image reading apparatus side or the case where another form original has been mixed to the form originals and read by the image reading apparatus side is preliminarily recognized. The form recognizing process can be also executed in consideration of the truth/falsehood of the form data. The reliability to the data of each page of the form to be converted into the electronic data can be raised.

The notifying means notifies the image reading apparatus or the data processing apparatus with which it can communicate through the network of the form error.

Thus, the person who has inputted the form or the like is certainly notified that the form data in which the form error has occurred was formed, thereby making it possible to promote him to confirm the form original and execute the inputting operation again.

Embodiment 12

There is disclosed the image processing method in the image reading apparatus which has the form information storing means for storing the types of form originals to be read and the page construction information of each form and can transfer image information obtained by reading the form original to the server apparatus through the network, comprising: the designation step (step S5 shown in FIG. 5) of designating the type of form original to be read; the scanning step (step S17 shown in FIG. 6) of scanning a plurality of form originals in a lump on a page unit basis and outputting the form original images; the forming step (step S18 shown in FIG. 6) of forming the form data by collecting the form original images which are scanned in a lump in the scanning step on the basis of the page construction information stored in the form information storing means on the basis of the type of form original which is designated in the designation step; and the transmission step (step S28 shown in FIG. 7) of transmitting the form data which is formed in the forming step to the server.

There is disclosed the image processing method in the server apparatus which has the template storing means for storing the template showing the form construction to be subjected to the character recognizing process every form type and which can obtain the form data which is formed by the image reading apparatus through the network, comprising: the character recognition processing step (steps S58 and S59 shown in FIG. 8) of executing the character recognizing process to each page of the form data on the basis of the template which is specified from the template storing means in accordance with the form type which is allocated to the form data; and the file forming step (step S60 shown in FIG. 8) of forming the text data of each page, as an electronic form file, which is recognized in the character recognition processing step.

Thus, effects similar to the embodiment 8 can be expected.

There is disclosed the image processing method according to the embodiment 19, comprising: the form recognizing step (step S74 shown in FIG. 9) of performing the form recognition of each page of the form data; and the notifying step (step S76 shown in FIG. 9) of notifying of the form error when the form recognition result of each page which is recognized in the form recognizing step does not coincide with the form type stored in the template storing means.

This application claims priority from Japanese Patent Application No. 2005-023178 filed on Jan. 31, 2005, which is hereby incorporated by reference herein.

What is claimed is:

1. An image reading apparatus comprising:
a storage unit adapted to store pattern information corresponding to a plurality of form types, each of the form types corresponding to a plurality of pages, the pattern information including at least numbers of pages for the corresponding form types;
an input unit adapted to receive a form type of an original input by a user, the original including a plurality of forms;
an obtaining unit adapted to obtain the number of pages for the form type received by said input unit based on the pattern information stored by said storage unit;
a reading unit adapted to read the original and to generate electronic data corresponding to the original;
a dividing unit adapted to divide, based on the number of pages for the received form type, the electronic data generated by said reading unit into a plurality of separate groups, each group including electronic data of the number of pages for a different one of the plurality of forms; and
a transmission unit adapted to allocate the pattern information corresponding to the received form type to each of the separate groups of electronic data and to transmit the separate groups of electronic data to a server apparatus,
wherein said dividing unit retains a portion of the electronic data generated by said reading unit if the portion does not reach the number of pages for the received form type, and, upon a subsequent dividing process, acquires the retained portion of the electronic data, combines the acquired portion of the electronic data with newly generated electronic data, and divides the combined electronic data into a plurality of separate groups.

2. An image reading apparatus according to claim 1, wherein the pattern information stored by said storage unit includes a duplex or simplex attribute for the corresponding form types, and wherein said reading unit reads the original and generates the electronic data based on the duplex or simplex attribute for the received form type.

3. An image reading apparatus according to claim 2, wherein said reading unit (a) reads one side of the original and generates the electronic data corresponding to the read side of the original if the duplex or simplex attribute for the received form type indicates a simplex mode, (b) reads both sides of the original and generates the electronic data corresponding to the read sides of the original if the duplex or simplex attribute indicates a duplex mode, and (c) reads both sides of the original and generates the electronic data corresponding to a non-blank page of the original without generating the electronic data corresponding to a blank page of the original if the duplex or simplex attribute indicates a mixed mode.

4. An image reading apparatus according to claim 1, wherein the pattern information stored by said storage unit includes scan mode information indicating for each page included in the corresponding form types whether reading is necessary or unnecessary, and wherein said reading unit reads a page of the original if the scan mode information for the received form type indicates that reading is necessary for the page, and does not read a page of the original if the scan mode information for the received form type indicates that reading is unnecessary for the page.

5. An image reading method comprising:
a storage step of storing pattern information corresponding to a plurality of form types, each of the form types corresponding to a plurality of pages, the pattern information including at least numbers of pages for the corresponding form types;

an input step of receiving a form type of an original input by a user, the original including a plurality of forms;

an obtaining step of obtaining the number of pages for the form type received in said input step based on the pattern information stored in said storage step;

a reading step of reading the original and generating electronic data corresponding to the original;

a dividing step of dividing, based on the number of pages for the received form type, the electronic data generated in said reading step into a plurality of separate groups, each group including electronic data of the number of pages for a different one of the plurality of forms; and a transmission step of allocating the pattern information corresponding to the received form type to each of the separate groups of electronic data and transmitting the separate groups of electronic data to a server apparatus, wherein said dividing step includes retaining a portion of the electronic data generated in said reading step if the portion does not reach the number of pages for the received form type, and, upon a subsequent dividing process, acquiring the retained portion of the electronic data, combining the acquired portion of the electronic data with newly generated electronic data, and dividing the combined electronic data into a plurality of separate groups.

6. An image reading method according to claim 5, wherein the pattern information stored in said storage step includes a duplex or simplex attribute for the corresponding form types, and wherein said reading step reads the original and generates the electronic data based on the duplex or simplex attribute for the received form type.

7. An image reading method according to claim 5, wherein said reading step (a) reads one side of the original and generates the electronic data corresponding to the read side of the original if the duplex or simplex attribute for the received form type indicates a simplex mode, (b) reads both sides of the original and generates the electronic data corresponding to the read sides of the original if the duplex or simplex attribute indicates a duplex mode, and (c) reads both sides of the original and generates the electronic data corresponding to a non-blank page of the original without generating the electronic data corresponding to a blank page of the original if the duplex or simplex attribute indicates a mixed mode.

8. An image reading method according to claim 5, wherein the pattern information stored in said storage step includes scan mode information indicating for each page included in the corresponding form types whether reading is necessary or unnecessary, and wherein said reading step reads a page of the original if the scan mode information for the received form type indicates that reading is necessary for the page, and does not read a page of the original if the scan mode information for the received form type indicates that reading is unnecessary for the page.

9. A computer-readable storage medium that stores a computer program that, when executed by a computer, causes the computer to perform an image reading method, the method comprising:

a storage step of storing pattern information corresponding to a plurality of form types, each of the form types corresponding to a plurality of pages, the pattern information including at least numbers of pages for the corresponding form types;

an input step of receiving receive a form type of an original input by a user, the original including a plurality of forms;

a reading step of reading the original and to generate electronic data corresponding to the original;

a dividing step of dividing, based on the number of pages for the received form type, the electronic data generated in said reading step into a plurality of separate groups, each group including electronic data of the number of pages for a different one of the plurality of forms; and a transmission step of allocating the pattern information corresponding to the received form type to each of the separate groups of electronic data and transmitting the plurality of electronic data to a server apparatus, wherein said dividing step includes retaining a portion of the electronic data generated in said reading unit if the portion does not reach the number of pages for the received form type, and, upon a subsequent dividing process, acquiring the retained portion of the electronic data, combining the acquired portion of the electronic data with newly generated electronic data, and dividing the combined electronic data into a plurality of separate groups.

* * * * *